US008654396B2

(12) United States Patent
Yamaguchi et al.

(10) Patent No.: US 8,654,396 B2
(45) Date of Patent: Feb. 18, 2014

(54) IMAGE PROCESSING DEVICE, IMAGE PROCESSING METHOD, AND IMAGE PROCESSING PROGRAM STORAGE MEDIUM

(75) Inventors: Yuya Yamaguchi, Kanagawa (JP); Yusuke Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 260 days.

(21) Appl. No.: 13/052,472

(22) Filed: Mar. 21, 2011

(65) Prior Publication Data

US 2011/0235072 A1    Sep. 29, 2011

(30) Foreign Application Priority Data

Mar. 25, 2010   (JP) .................................. 2010-070973
Feb. 23, 2011   (JP) .................................. 2011-037473

(51) Int. Cl.
    *H04N 1/40*    (2006.01)
(52) U.S. Cl.
    USPC ............................. 358/1.9; 358/443; 358/448
(58) Field of Classification Search
    USPC .......... 358/1.9, 2.1, 400, 406, 500, 504, 3.23, 358/530, 534, 443, 448
    See application file for complete search history.

(56) References Cited

U.S. PATENT DOCUMENTS

| 4,963,898 | A | * | 10/1990 | Kadowaki et al. | 347/119 |
| 5,168,292 | A | * | 12/1992 | Kadowaki et al. | 347/115 |
| 5,351,074 | A | * | 9/1994 | Kadowaki et al. | 347/115 |
| 6,535,633 | B1 | * | 3/2003 | Schweid et al. | 382/165 |
| 2008/0158577 | A1 | | 7/2008 | Yamaguchi et al. | |

FOREIGN PATENT DOCUMENTS

| JP | A-2001-282494 | 10/2001 |
| JP | A-2005-092444 | 4/2005 |
| JP | A-2007-310450 | 11/2007 |
| JP | A-2008-162132 | 7/2008 |

* cited by examiner

*Primary Examiner* — Thomas D Lee
*Assistant Examiner* — Stephen M Brinich
(74) *Attorney, Agent, or Firm* — Oliff PLC

(57) ABSTRACT

An image processing device includes print processors for different colors, plural first conversion sections provided for each of the print processors, a second conversion section, and a controller. Each of the print processors performs printing of a corresponding color onto a recording medium. Each of the first conversion sections converts print data described in page description language into raster image data, and outputs the converted raster image data to the corresponding print processor. The second conversion section converts the print data into raster image data and outputs the converted raster image data to any of the print processors. The controller selectively performs a first control that causes the first conversion sections to convert the print data that has been input to the device in parallel, or a second control that causes the first conversion sections and the second conversion section to convert the input print data in parallel.

12 Claims, 17 Drawing Sheets

IMAGE PROCESSING DEVICE, IMAGE PROCESSING METHOD, AND IMAGE PROCESSING PROGRAM STORAGE MEDIUM

CROSS-REFERENCE TO RELATED APPLICATION

This application is based on and claims priority under 35 USC 119 from Japanese Patent Applications No 2010-070973 filed on Mar. 25, 2010, and No. 2011-037473 filed on Feb. 23, 2011.

BACKGROUND

1. Technical Field

The present invention relates to an image processing device, an image processing method, and an image processing program storage medium.

2. Related Art

A controller of a printing device typically performs processing of receiving print data described in page description language from a host device, converting the received print data into raster image data, and outputting the converted raster image data to a print processing device. A technique has been known in which the conversion processing is performed by plural conversion sections in parallel in order to reduce the time until outputting of the raster image data to the print processing device.

SUMMARY

An aspect of the present invention is an image processing device including: plural print processors for different colors, each of the plural print processors performing printing of a corresponding color onto a recording medium; plural first conversion sections provided for each of the plural print processors, each of the plural first conversion sections converting print data described in page description language into raster image data, and outputting the converted raster image data to the corresponding print processor; a second conversion section that converts the print data into raster image data and outputs the converted raster image data to any of the plural print processors; and a controller that selectively performs a first control that causes the plural first conversion sections to convert the print data that has been input to the device in parallel, or a second control that causes the plural first conversion sections and the second conversion section to convert the input print data in parallel.

BRIEF DESCRIPTION OF THE DRAWINGS

Exemplary embodiments of the present invention will be described in detail based on the following figures, wherein.

DETAILED DESCRIPTION

[First Exemplary Embodiment]

Figure 1:
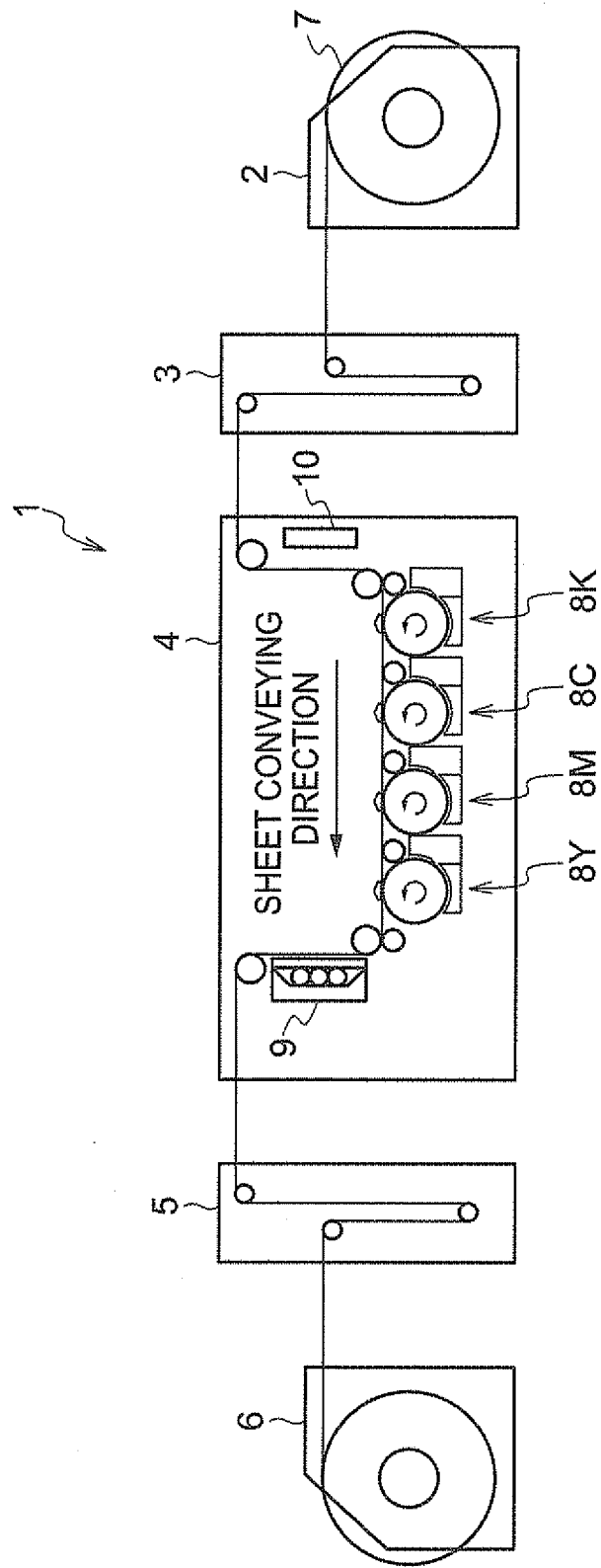
FIG. 1 is a schematic structural drawing showing an example of the schematic structure of a printing system relating to a first exemplary embodiment.

First, a printing system of the present exemplary embodiment is described. FIG. 1 is a schematic structural drawing showing an example of the schematic structure of the printing system of the present exemplary embodiment. A printing system 1 carries out, at a printer 4, printing of color images on a continuous sheet 7 that serves as a recording medium.

The printing system 1 has a pre-processing device 2, a buffer device 3, the printer 4, a buffer device 5, a post-processing device 6, and the image processing device 10.

The pre-processing device 2 carries out various types of pre-processings (e.g., the formation of punch holes, cut lines, or the like) before printing on the continuous sheet 7. The buffer device 3 absorbs the difference in the processing speed of the pre-processing device 2 and the processing speed of the printer 4.

The printer 4 has image formation sections 8 (8Y, 8M, 8C, 8K) for respective different colors, and prints color images on the continuous sheet 7. The image formation sections 8 print images on the continuous sheet 7 by an electrophotographic method. Specifically, a charging device, an exposure device, a developing device, a transfer device, a cleaning device, a charge removing device, and the like are disposed in that order at the periphery of each of photoreceptors that correspond to yellow (Y), magenta (M), cyan (C) and black (K). A fixing device 9 is disposed at the sheet conveying direction downstream side.

Concretely, the photoreceptor is rotated, and the surface of the photoreceptor is charged uniformly by the charging device. Due thereto, a latent image is formed by the exposure device on the surface of the photoreceptor. The latent image formed on the surface of the photoreceptor is developed by the developing device such that a toner image is formed, and the toner image is transferred onto the continuous sheet 7 by the transfer device. The toner images that have been transferred onto the continuous sheet 7 are fixed by the fixing device 9. Further, the toner on the surface of the photoreceptor, that remains thereon without being transferred onto the continuous sheet 7 by the transfer device, is removed by the cleaning device. After charges are removed by the charging device, the above-described processings are repeated from the charging by the charging device, and printing is thereby carried out. As well as the electrophotographic method, various methods such as inkjet method can be applied to the printing of images.

The continuous sheet 7, on which an image has been printed by the printer 4, is conveyed to the post-processing device 6 via the buffer device 5. The buffer device 5 absorbs the difference between the processing speed of the printer 4 and the processing speed of the post-processing device 6. The post-processing device 6 takes-up the continuous sheet 7 and carries out various types of post-processings (e.g., cutting to a predetermined size, bookbinding, and the like) on the continuous sheet 7 on which the image has been formed by the printer 4.

Figure 2:
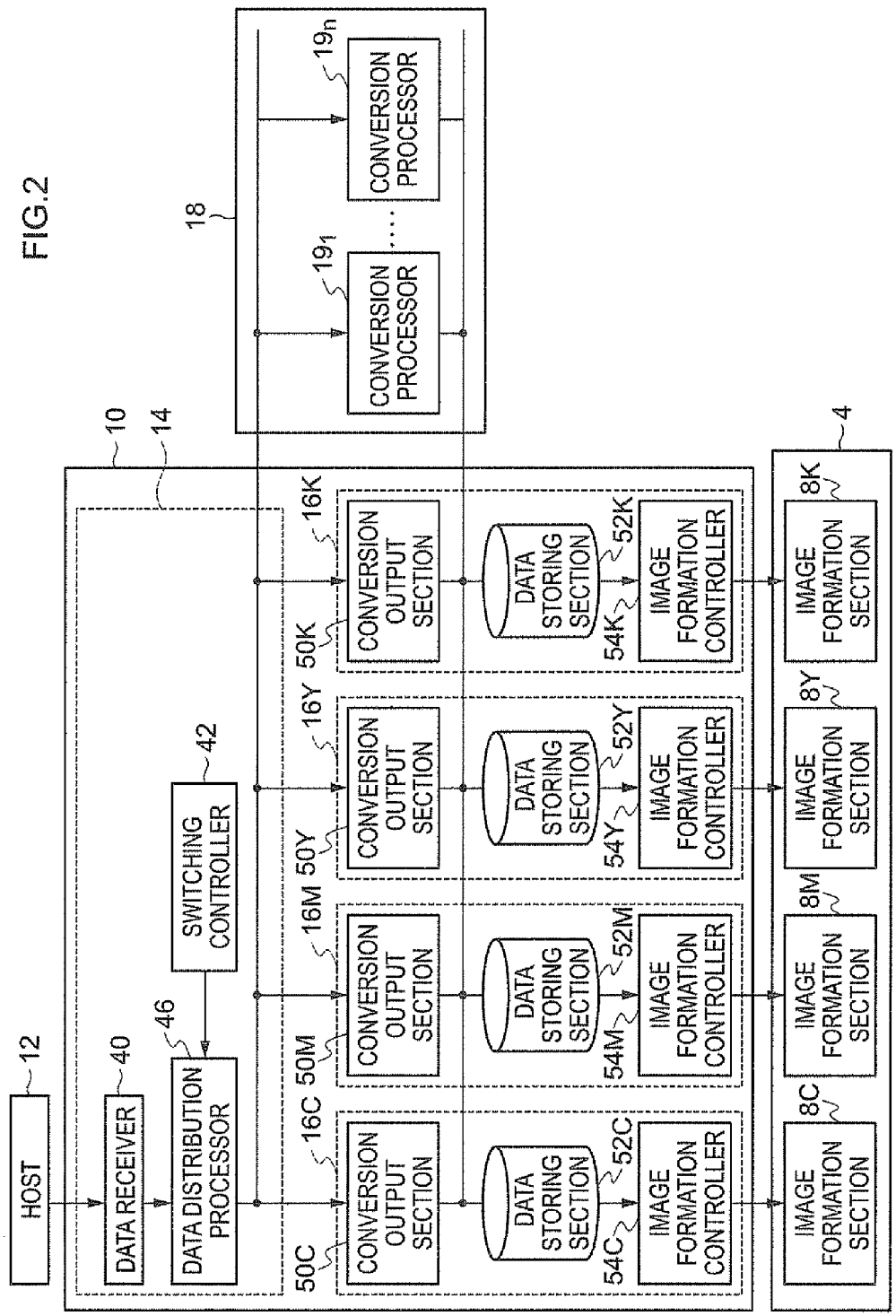
FIG. 2 is a functional block diagram showing an example of an overall schematic configuration of an image processing device relating to the first exemplary embodiment.

The overall schematic configuration of the image processing device 10 are described next. FIG. 2 is a functional block diagram showing an example of the overall schematic configuration of the image processing device 10.

The image processing device 10 has a controller unit 14 and conversion output sections 16C, 16M, 16Y, 16K.

The controller unit 14 of the image processing device 10 and a host device 12, that transmits image data to the image processing device 10, are connected by a communication line unit 14 such as a network or a LAN line or the like, such that various types of data can be transferred therebetween.

Further, the controller unit 14, the conversion output sections 16C, 16M, 16Y, 16K, and external conversion processors 19$_1$ through 19$_n$ of an external conversion processor group 18 are connected by a communication line 15 such as a network or a LAN line or the like, such that various types of data can be transferred therebetween.

In the image processing device 10 of the present exemplary embodiment, outputs of converters 50C, 50M, 50Y and 50K (described later in detail) of the conversion output sections 16C, 16M, 16Y, 16K are connected through a bus such as a PCT Express, and outputs of the external conversion processors 19$_1$ through 19$_n$ are connected through a network or communication lines such as a LAN. Thus, processors that perform conversion and the outputs of which are connected to the conversion output sections 16C, 16M, 16Y, 16K (specifically, connected to image formation sections 8C, 8M, 8Y, 8K of the printer 4 via the conversion output sections 16C, 16M, 16Y, 16K) through communication lines, are referred to as "external" processors.

Note that, in the present exemplary embodiment, conversion includes Raster Image Processing (Rip) and rasterizing processing that expands vector data into raster image data.

The conversion output sections 16C, 16Y, 16M, 16K are respectively connected to the image formation sections 8C, 8M, 8Y, 8K of the printer 4. Information for image formation for the respective colors and raster image data that has been subjected to conversion are transmitted to the image formation sections 8C, 8M, 8Y, 8K.

Note that, in the following description, when generally referring to structures that are provided for the respective colors, such as the conversion output sections 16C, 16M, 16Y, 16K or the like, the letters CMYK denoting the respective colors are not appended to the reference numeral. Further, in the present exemplary embodiment, although the external conversion processor group 18 is illustrated that they includes the n external conversion processors 19$_1$ through 19$_n$, when generally referring thereto, the numerals 1 through n are not appended to the reference numeral.

Figure 3:
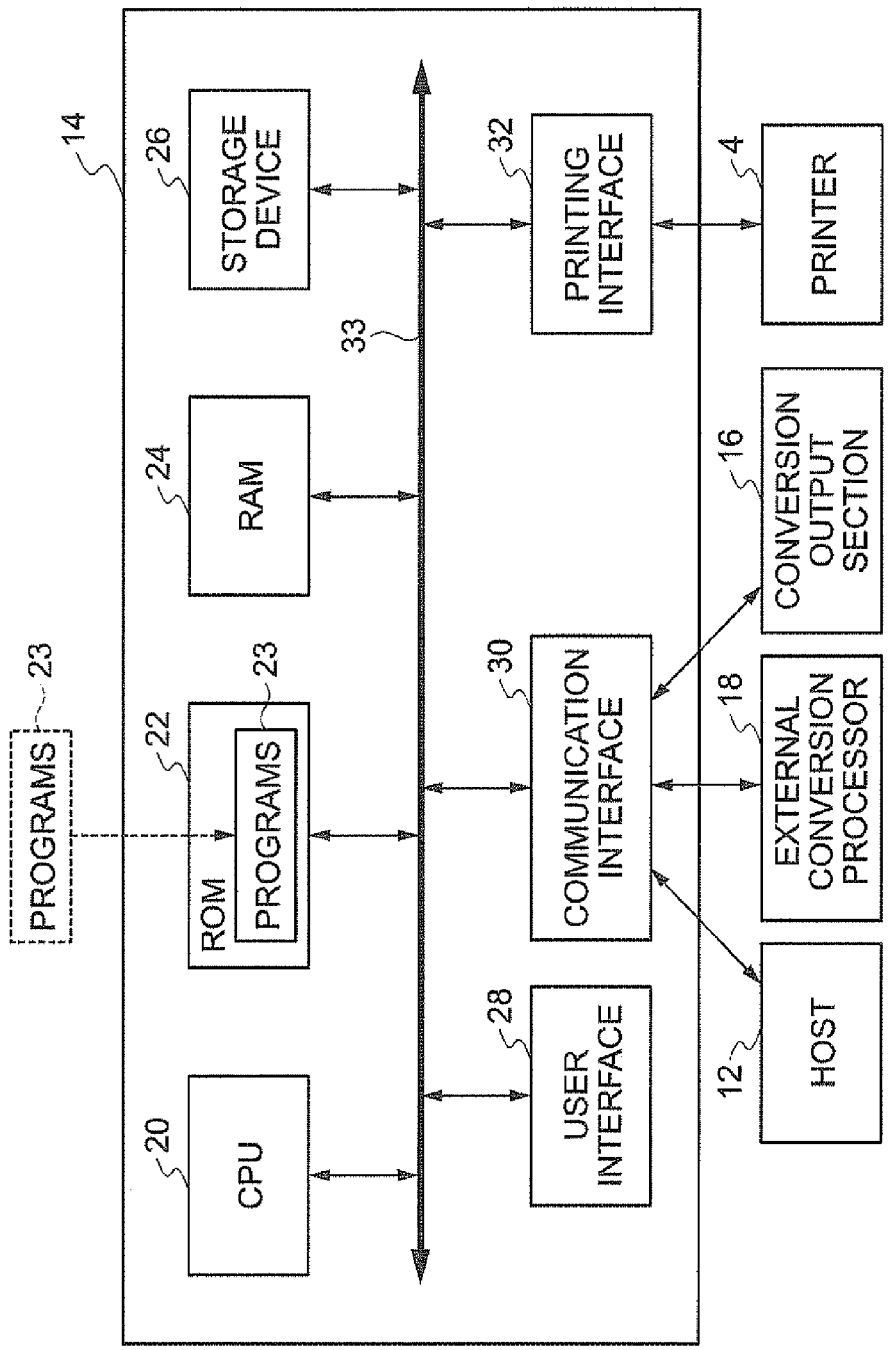
FIG. 3 is a schematic structural drawing showing an example of the schematic structure of hardware of a control system of a controller unit of the image processing device relating to the first exemplary embodiment.

An example of the schematic structure of the hardware of the control system of the controller unit 14 is shown in FIG. 3.

The controller unit 14 of the image processing device 10 includes a CPU 20, a ROM 22, a RAM 24, a storage device 26, a user interface 28, a communication interface 30, and a printing interface 32.

The CPU 20 carries out control of the controller unit 14 overall, and the like, and concretely, carries out control by executing programs 23 that are stored in the ROM 22. Note that, although the present exemplary embodiment is structured such that the programs 23 are stored in advance, the exemplary embodiment is not limited to the same. The programs 23 may be stored on a recording medium or the like such as a CD-ROM or a removable disk or the like, and installed from the recording medium into the ROM 22 or the like. Or, the programs 23 may be installed in the ROM 22 or the like from an external device via a communication line such as the internet. The RAM 24 provides a work area at the time when the programs 23 are executed at the CPU 20.

The storage device 26 stores data and the like that are needed at the time of processings and the like, that will be described later, at the controller unit 14. Concrete examples of the storage device 26 are a memory, a hard disk, and the like.

The user interface 28 allows a user to carry out various instructions or presents information to the user. Concrete examples of the user interface 28 are a touch display, a keyboard, a mouse, a speaker, and the like.

The communication interface 30 is an interface that carries out communication between the controller unit 14 and devices at the exterior (the host device 12, the conversion output sections 16, the external conversion processor group 18, and the like), and carries out transfer of various types of data. The printing interface 32 is an interface that carries out communication with the printer 4, and carries out transfer of printing instructions and various types of data such as image data that has subjected to the conversion.

The CPU 20, the ROM 22, the RAM 24, the storage device 26, the user interface 28, the communication interface 30 and the printing interface 32 are connected by a communication line 33 such as a network or a LAN, such that various types of data can be transferred therebetween.

Further, the controller unit 14 of the image processing device 10 has a data receiver 40, a switching controller 42, a pre-processor 44, and a data distribution processor 46.

The data receiver 40 has the function of receiving, from the host device 12, jobs that include image data and information relating to printing instructions of that image data.

The data distribution processor 46 has the function of carrying out, in accordance with the instructions of the switching controller 42, either of a first distribution in which the data distribution processor 46 distributes information for converting the page data of the image data to the conversion output sections 16, or a second distribution in which the data distribution processor 46 distributes the information to the conversion output sections 16 and the external conversion processor group 18. Note that, in the present exemplary embodiment, the data distribution processor 46 distributes page data of different pages to each of the conversion output sections 16.

The switching controller 42 controls the data distribution processor 46 to switch between a first control that causes the data distribution processor 46 to perform the first distribution, and a second control that causes the data distribution processor 46 to perform the second distribution, on the basis of processing information (data) (to be described in detail later) that expresses the processing speeds of the conversion carried out at the conversion output sections 16 and the operating statuses of the CPUs of the conversion output sections 16 and the like, or a user instruction setting. Further, the switching controller 42 holds a flag (details thereof to be described later) that makes the first distribution (the first control) be carried out or makes the second distribution (the second control) be carried out.

The conversion output section 16 of the image processing device 10 includes a converter 50, a data storing section 52 and an image formation controller 54.

The conversion output section 16 carries out conversion with the converter 50 on the page data of the current job that has been distributed from the data distribution processor 46, and stores, in the data storing section 52, the rasterized data of the color that that the conversion output section 16 itself is in charge of, and transmits the rasterized data of the other colors to the conversion output sections 16 that are in charge of those colors respectively. The transmitted rasterized data of the other colors are stored in the data storing sections 52 of the conversion output sections 16 corresponding to the respective colors. Note that the rasterized data of the current job, on which Rip processing has been carried out at the external conversion processors 19, is distributed to the conversion output sections 16 corresponding to the respective colors, and is stored in the data storing sections 52 of the respective conversion output sections 16.

Further, the image formation controller 54 of the conversion output section 16 controls the image formation section 8 of the printer 4, and outputs the rasterized data, that is stored in the data storing section 52, to the image formation section 8 of the corresponding color in accordance with the processing status of the image formation section 8.

Figure 4:
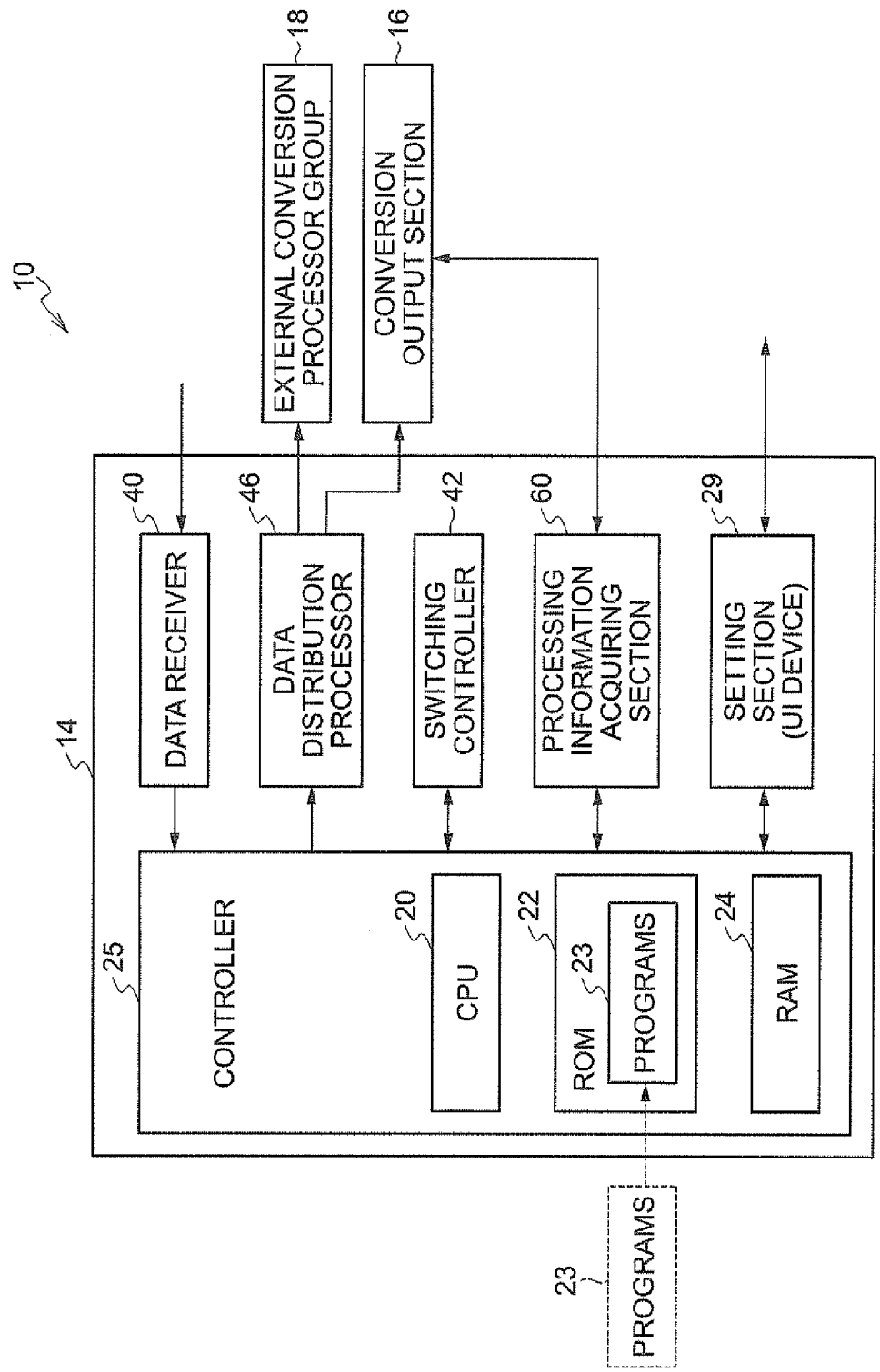
FIG. 4 is a functional block diagram showing an example of the schematic structure of the controller unit relating to the first exemplary embodiment.
Figure 5:
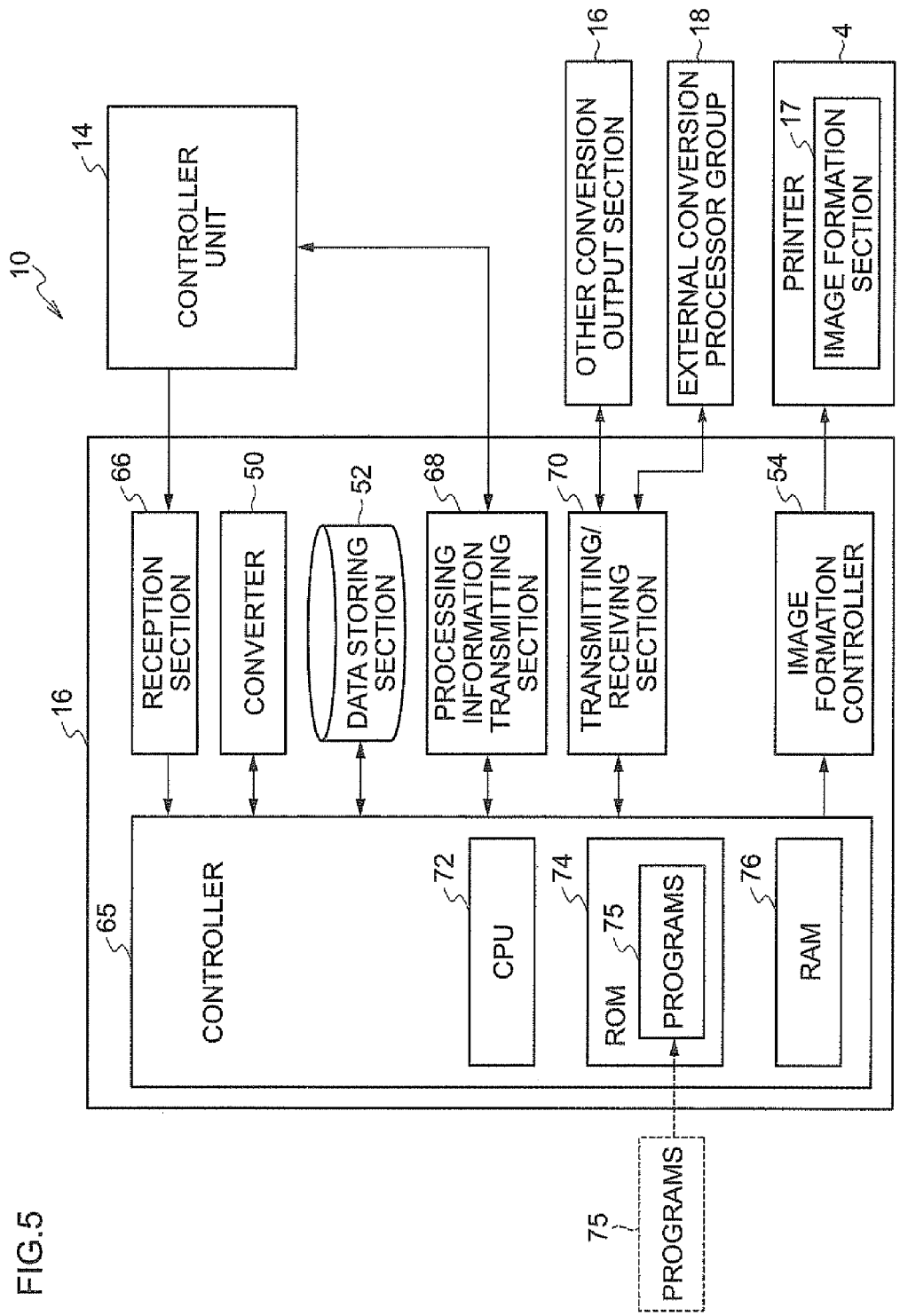
FIG. 5 is a functional block diagram showing an example of the schematic structure of a conversion output section relating to the first exemplary embodiment.

The schematic structures of the controller unit 14 and the conversion output section 16 of the present exemplary embodiment are described in detail next. FIG. 4 is a functional block diagram showing an example of the schematic structure of the controller unit 14, and FIG. 5 is a functional block diagram showing an example of the schematic structure of the conversion output section 16.

The controller unit 14 has a controller 25, the setting section (user interface) 28, the data receiver 40, the switching controller 42, the data distribution processor 46, and a processing information acquiring section 60.

The controller 25 has the function of controlling the controller unit 14 overall. Specifically, the controller 25 includes the aforementioned CPU 20, ROM 22, and RAM 24.

The processing information acquiring section 60 acquires information relating to conversion from each of the conversion output sections 16. In the present exemplary embodiment, as a concrete example, the conversion speed, the number of pages that have not yet been processed, the usage rate of a CPU 72 provided at the conversion output section 16, and the usage rate of the memory (an RAM 76 or the like) provided at the conversion output section 16, are acquired as the processing information.

A setting section 29 in the present exemplary embodiment includes the user interface 28. The setting section 29 has the functions (to be described in detail later) of, through the user interface 28, presenting to the user the processing information acquired by the processing information acquiring section 60, and allowing setting, with manual operation by the user, of whether to cause the data distribution processor 46 to carry out the first distribution or to carry out the second distribution.

The conversion output section 16 of the present exemplary embodiment has the converter 50, the data storing section 52, the image formation controller 54, a controller 65, a reception section 66, a processing information transmitting section 68, and a transmitting/receiving section 70.

The controller 65 controls the conversion output section 16 overall, and concretely, is structured to include the CPU 72, a ROM 74 and the RAM 76. The present exemplary embodiment is structured such that programs 75 are stored in advance in the ROM 74, but the exemplary embodiment is not limited to the same. The programs 75 may be stored on a recording medium such as a CD-ROM or a removable disk, and installed from the recording medium into the ROM 74. Or, the programs 75 may be installed in the ROM 74 from an external device via a communication line such as the internet. The RAM 76 provides a work area at the time when the programs 75 are executed at the CPU 72.

The reception section 66 receives requests for conversion from the controller unit 14. The transmitting/receiving section 70 transmits, among the rasterized data that has undergone the conversion, the rasterized data that is not the color that that the conversion output section 16 itself is in charge of to the conversion output sections 16 that are in charge of those colors, and receives the rasterized data of the color that it is in charge of, and receives the rasterized data that has been subjected to the conversion at the external conversion processors 19.

Figure 6:
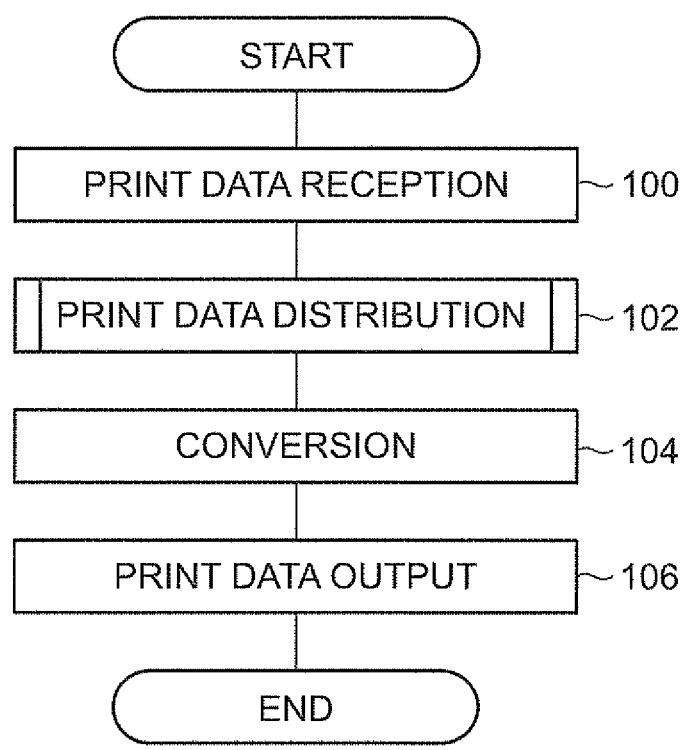
FIG. 6 is a flowchart showing an example of the flow of overall image processing that is carried out at the image processing device relating to the first exemplary embodiment.

Image processing that is carried out at the image processing device 10 is described next. FIG. 6 is a flowchart showing an example of the flow of the overall image processing that is carried out at the image processing device 10.

In step 100, receiving processing, in which print data (image data) is received, is carried out by the data receiver 40. In next step 102, print data distribution processing, in which the received print data is distributed per page to the conversion output sections 16, or to the conversion output sections 16 and the external conversion processor group 18, is executed by the data distribution processor 46 (details will be described later).

In next step 104, conversion of the print data is carried out by the converter 50 of the conversion output sections 16. In subsequent step 108, print data outputting processing is carried out in which the print data, that is expanded into rasterized data by the conversion, is outputted by the image formation controller 54 to the printer 4, and image formation is controlled. Thereafter, the present processing ends.

Note that the print data distribution processing of step 102 and the conversion processing of step 104 may be carried out in parallel. Further, the conversion processing of step 104 may be carried out after the print data of all of the pages is received by the print data receiving processing of step 100, or the processings may be carried out in parallel (the received pages may be successively distributed to the conversion output sections 16 and subjected to conversion). Moreover, the print data distribution processing of step 106 may be carried out after the conversion processing of step 104 has been finished for all of the print data, or the processings may be carried out in parallel (the rasterized data of a page on which conversion has been carried out may be successively outputted to the printer 4).

The print data distribution processing will be described in detail next. In the present exemplary embodiment, there are cases in which the switching controller 42 switches between the first distribution and the second distribution on the basis of a predetermined condition, i.e., automatically, and cases in which the switching controller 42 switches between the first distribution and the second distribution in accordance with the user's instruction from the setting section 29, i.e., in accordance with manual operation by the user. Note that, in the present exemplary embodiment, usually, the switching controller 42 carries out the switching automatically. However, the switching controller 42 carries out the switching manually when a user gives an instruction from the setting section 29.

Figure 7:
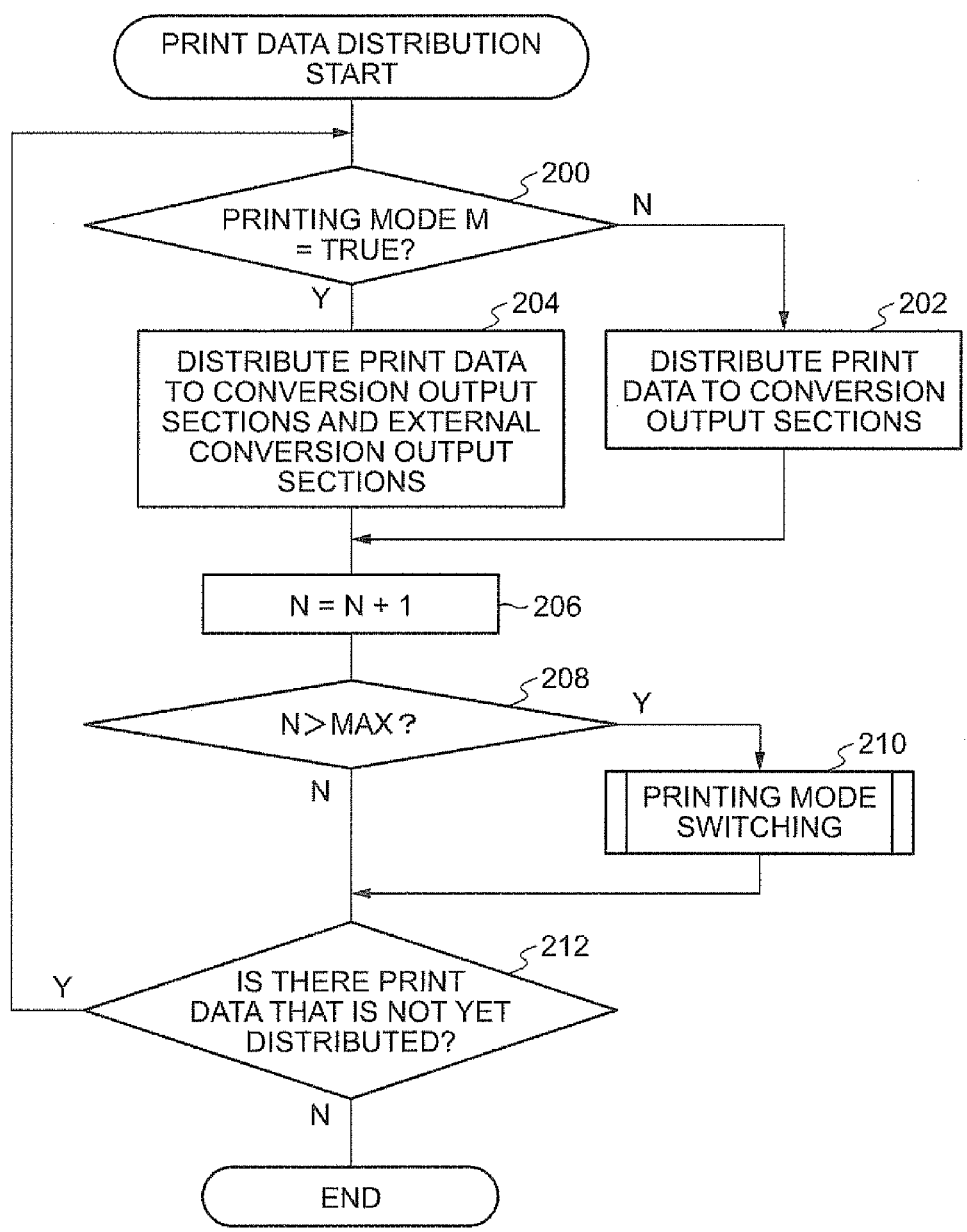
FIG. 7 is a flowchart showing an example of the flow of print data distribution processing that is executed at a controller of the controller unit when a switching controller relating to the first exemplary embodiment carries out switching automatically.

First, print data distribution processing in the former case (the case in which the switching controller 42 carries out the switching automatically) is described. A flowchart of an example of print data distribution processing that is executed at the controller 25 of the controller unit 14 is shown in FIG. 7.

In step 200, it is judged whether or not a printing mode M is "true". In the present exemplary embodiment, the printing mode M is a flag that expresses whether print data is to be distributed to the external conversion processor group 18 (whether the external conversion processor group 18 is to be made to carry out Rip processing). If print data is to be distributed to the external conversion processor group 18, "true" is set, whereas if print data is not to be distributed thereto, "false" is set. In the present exemplary embodiment, in the initial state (e.g., when printing starts, or when the power of the controller unit 14 is turned on), "false" is set.

If the judgment is negative, the routine moves on to step 202 where print data is distributed only to the conversion output sections 16 so that the external conversion processor group 18 will not be used in the conversion, and the routine moves on to step 206. On the other hand, if the judgment is affirmative, the routine moves on to step 204, and the print data is distributed to the conversion output sections 16 and the external conversion processor group 18 so that the conversion will be carried out using both the conversion output sections 16 and the external conversion processor group 18.

In next step 206, a variable N is incremented. Note that, in the present exemplary embodiment, in order to carry out printing mode switching processing (the processing of step 210 that will be described later) periodically during a single job, the number of times that pages are distributed to the conversion output sections 16 is counted. This count number is the variable N. In the distribution of a single time, one page at a time may be distributed to each conversion output section 16 (and external conversion processor 19), or several pages at a time may be distributed.

In next step 208, it is judged whether or not N has exceeded max. Here, "max" is a threshold value for carrying out switching of the printing mode. Printing mode switching processing is carried out when the variable N exceeds max. If N does not exceed max, the judgment is negative and the routine moves on to step 212. If N exceeds max, the judgment is affirmative and the routine moves on to step 210 where printing mode switching processing (judging whether or not the printing mode is to be switched, and carrying out switching processing if a predetermined condition is satisfied, details of which will be described later) is carried out. Thereafter, the routine moves on to step 212. In next step 212, it is judged whether or not there is print data that has not yet been distributed. If there is such print data, the judgment is affirmative, the routine returns to step 200, and the present processing is repeated. If all of the pages have been distributed, there is no print data that has not yet been distributed. Therefore, the judgment is negative and the present processing ends.

Figure 8:
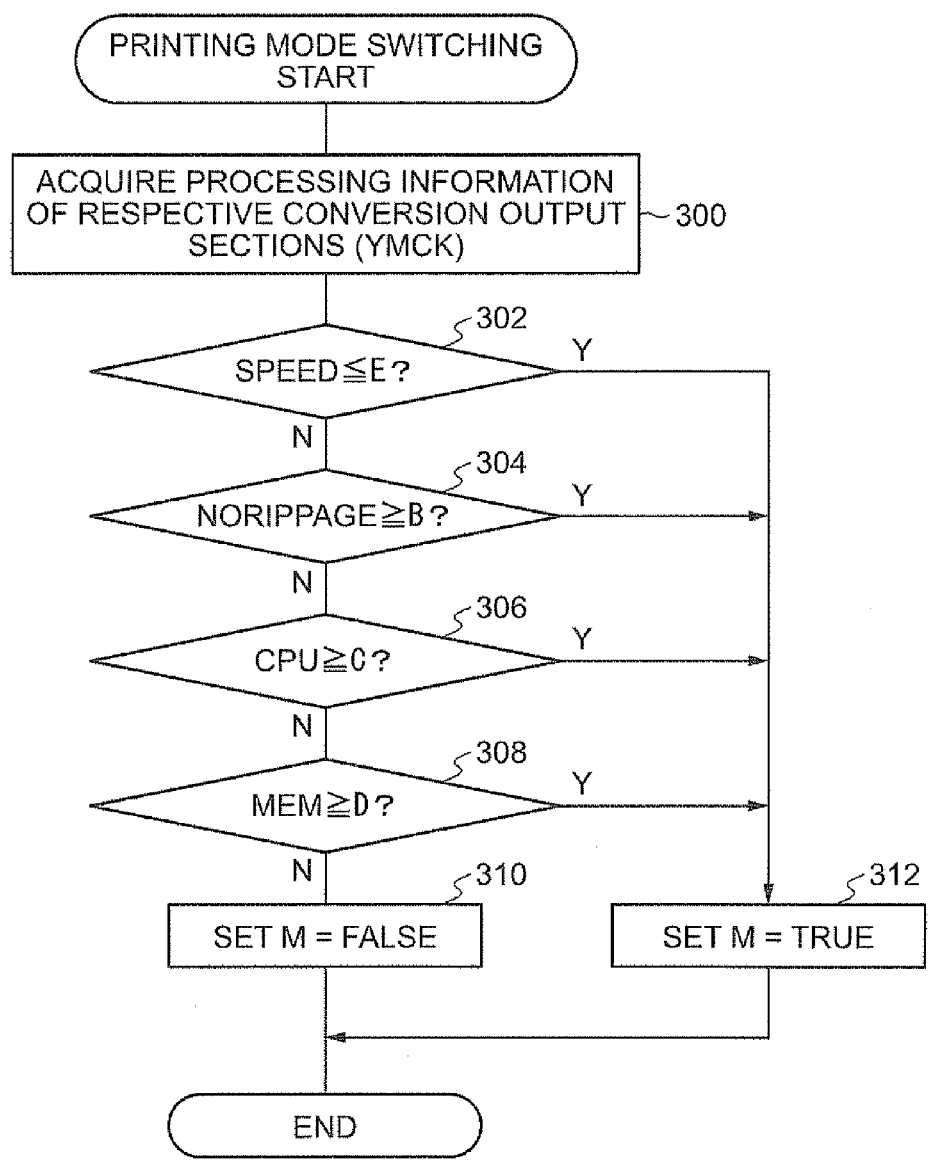
FIG. 8 is a flowchart showing an example of the flow of printing mode switching processing shown in FIG. 8.

The printing mode switching processing of aforementioned step 212 will be described in detail next. FIG. 8 is a flowchart showing an example of the printing mode switching processing. In this processing, processing information is acquired from the respective conversion output sections 16. If it is judged that the processing loads of the conversion output sections 16 are high, switching processing is carried out so that the external conversion processor group 18 is used in the conversion processing (i.e., so that the second distribution is carried out).

In step 300, the processing information acquiring section 60 acquires processing information from the processing information transmitting sections 68 of the respective conversion output sections 16.

In next step 302, it is judged whether or not Speed≤E. Here, "Speed" is the average value of the conversion processing speeds of the respective conversion output sections 16. The switching controller 42 computes the average values of the conversion processing speeds that the processing information acquiring section 60 acquired from the respective conversion output sections 16, and judges whether or not the computed average value is less than or equal to a threshold value E. The processing speed decreases when the processing load becomes high. Therefore, if the computed average value is less than or equal to the threshold value E, the judgment is affirmative and the routine moves on to step 312. However, if the computed average value exceeds the threshold value E, the routine moves on to step 304.

In step 304, it is judged whether or not NoRipPage≥B. Here, "NoRipPage" is the average value of the number of pages which are not yet converted (pages that have been distributed but that have not yet been subjected to conversion processing) of the respective conversion output sections 16. The switching controller 42 computes the average value of the numbers of the not yet converted pages that the processing information acquiring section 60 acquired from the respective conversion output sections 16, and judges whether or not the computed average value is greater than or equal to a threshold value B. The number of pages that have not yet been processed becomes large when the processing load is high. Therefore, if the computed average value is greater than or equal to the threshold value B, the judgment is affirmative and the routine moves on to step 312. However, if the computed average value is less than the threshold value B, the routine moves on to step 306.

In next step 306, it is judged whether or not CPU≥C. Here, "CPU" is the average value of the usage rates of the CPUs 72 of the respective conversion output sections 16. The switching controller 42 computes the average value of the usage rates of the CPUs 72 that the processing information acquiring section 60 acquired from the respective conversion output sections 16, and judges whether or not the computed average value is greater than or equal to the threshold value C. The usage rate of the CPU 72 becomes high when the processing load is high. Therefore, if the computed average value is greater than or equal to the threshold value C, the judgment is affirmative and the routine moves on to step 312. If the computed average value is less than the threshold value C, the routine moves on to step 308.

In next step 308, it is judged whether or not Mem≥D. Here, "Mem" is the average value of the usage rates of the memories (the RAMs 76) of the respective conversion output sections 16. The switching controller 42 computes the average value of the usage rates of the memories that the processing information acquiring section 60 acquired from the respective conversion output sections 16, and judges whether or not the computed average value is greater than or equal to the threshold value D. The usage rate of the memory becomes high when the processing load is high. Therefore, if the computed average value is greater than or equal to the threshold value D, the judgment is affirmative and the routine moves on to step 312. If the computed average value is less than the threshold value D, the routine moves on to step 310.

In step 310, the printing mode M is set to printing mode M=false (the first distribution processing that distributes only to the conversion output sections 16), and thereafter, the present processing ends. In step 312 where it has been judged that the processing load is high, the printing mode M is set to printing mode M=true (the second distribution processing that distributes to the conversion output sections 16 and the external conversion processor group 18), and thereafter, the present processing ends.

In this way, when it is judged in the present processing that the processing loads of the conversion output sections 16 are high, the processing is switched to the second distribution, and, when it is judged that the processing loads are low, the processing is switched to the first distribution.

The threshold values E, B, C, D can be obtained in advance by carrying out measurement or the like.

The order of the processings of steps 302 through 308 may be rearranged. However, it is preferable that these processings be carried out successively in order of their importance as processing performances of the conversion output sections 16. It is particularly preferable that these processings be carried out in the order described in the present exemplary embodiment.

Further, in the present exemplary embodiment, the processings of steps 302 through 308 all compute an average value and compare it with a threshold value. However, the exemplary embodiment is not limited to the same, and the routine may proceed to step 302 when a value of any one of the conversion output sections 16 is compared with a threshold value and an affirmative judgment is reached.

Figure 9:
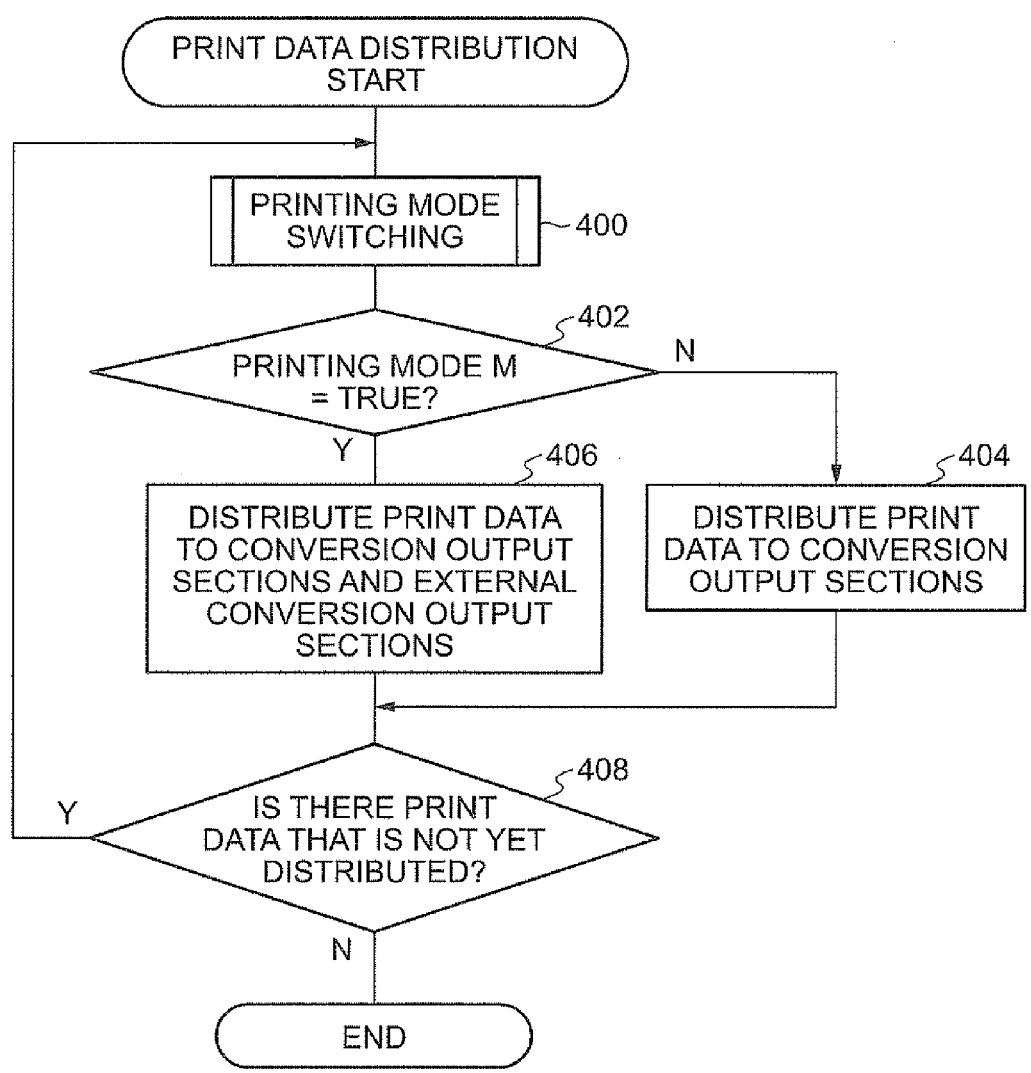
FIG. 9 is a flowchart showing an example of the flow of print data distribution processing that is executed at the controller of the controller unit when the switching controller carries out switching control in accordance with manual operation by a user, relating to the first exemplary embodiment.

Next, print data distribution processing in the latter case (the case in which the switching controller 42 carries out switching in accordance with manual operation by the user) is described. A flowchart of an example of print data distribution processing that is executed at the controller 25 of the controller unit 14 is shown in FIG. 9. The present processing corresponds to the print data distribution processing shown in FIG. 7. Step 400 of the present processing corresponds to step 210 of the print data distribution processing shown in FIG. 7, step 402 corresponds to step 200, step 404 corresponds to step 202, step 406 corresponds to step 204, and step 408 corresponds to step 212.

In step 400, printing mode switching processing (processing for switching the printing mode when a user has set and instructed that the printing mode be switched, details of which will be described later) is carried out. Thereafter, the routine proceeds to step 402. In step 402, it is judged whether or not the printing mode M is "true". If the judgment is negative, the routine moves on to step 404 and the first distribution processing is carried out. Thereafter, the routine moves on to step 408. If the judgment is affirmative, the routine move on to step 406, and the second distribution processing is carried out. Thereafter, the routine moves on to step 408. In step 408, it is judged whether or not there is print data that has not yet been distributed. If the judgment is affirmative, the routine returns to step 300 and the present processing is repeated. If the judgment is negative, the present processing ends.

Figure 10:
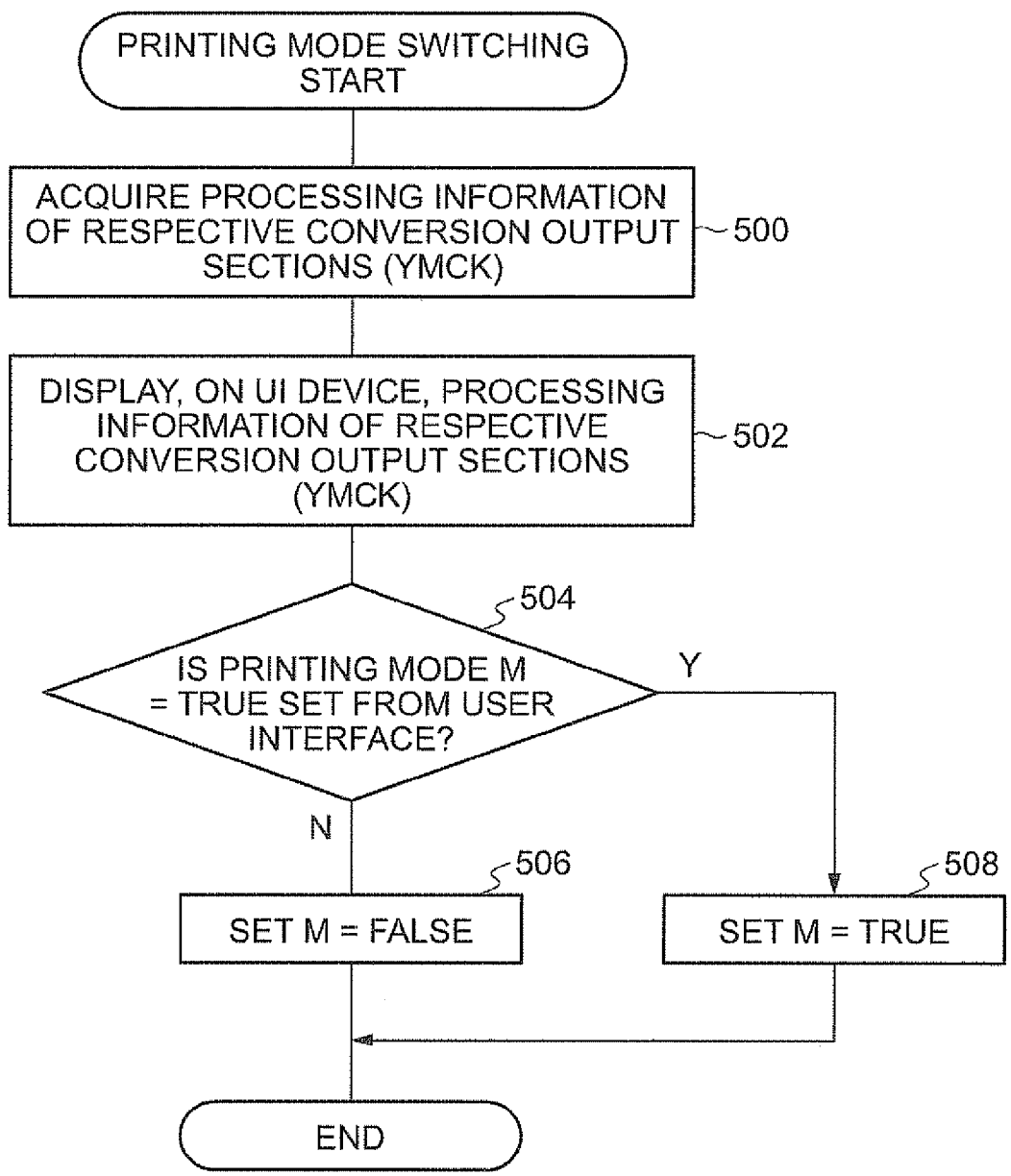
FIG. 10 is a flowchart showing an example of the flow of printing mode switching processing shown in FIG. 9.

The printing mode switching processing of step 400 will be described in detail next. FIG. 10 is a flowchart showing an example of the printing mode switching processing. In the processing, switching is carried out so that the external conversion processor group 18 is used in the conversion (i.e., so that the second distribution is carried out), in accordance with the setting instruction of the user who has confirmed the respective processing information of the conversion output sections 16. The present processing corresponds to the printing mode switching processing shown in FIG. 8. Step 500 of the present processing corresponds to step 300 of the printing mode switching processing shown in FIG. 8, step 506 corresponds to step 310, and step 508 corresponds to step 312.

In step 500, the processing information acquiring section 60 acquires processing information from the processing information transmitting sections 68 of the respective conversion output sections 16.

Figure 11:
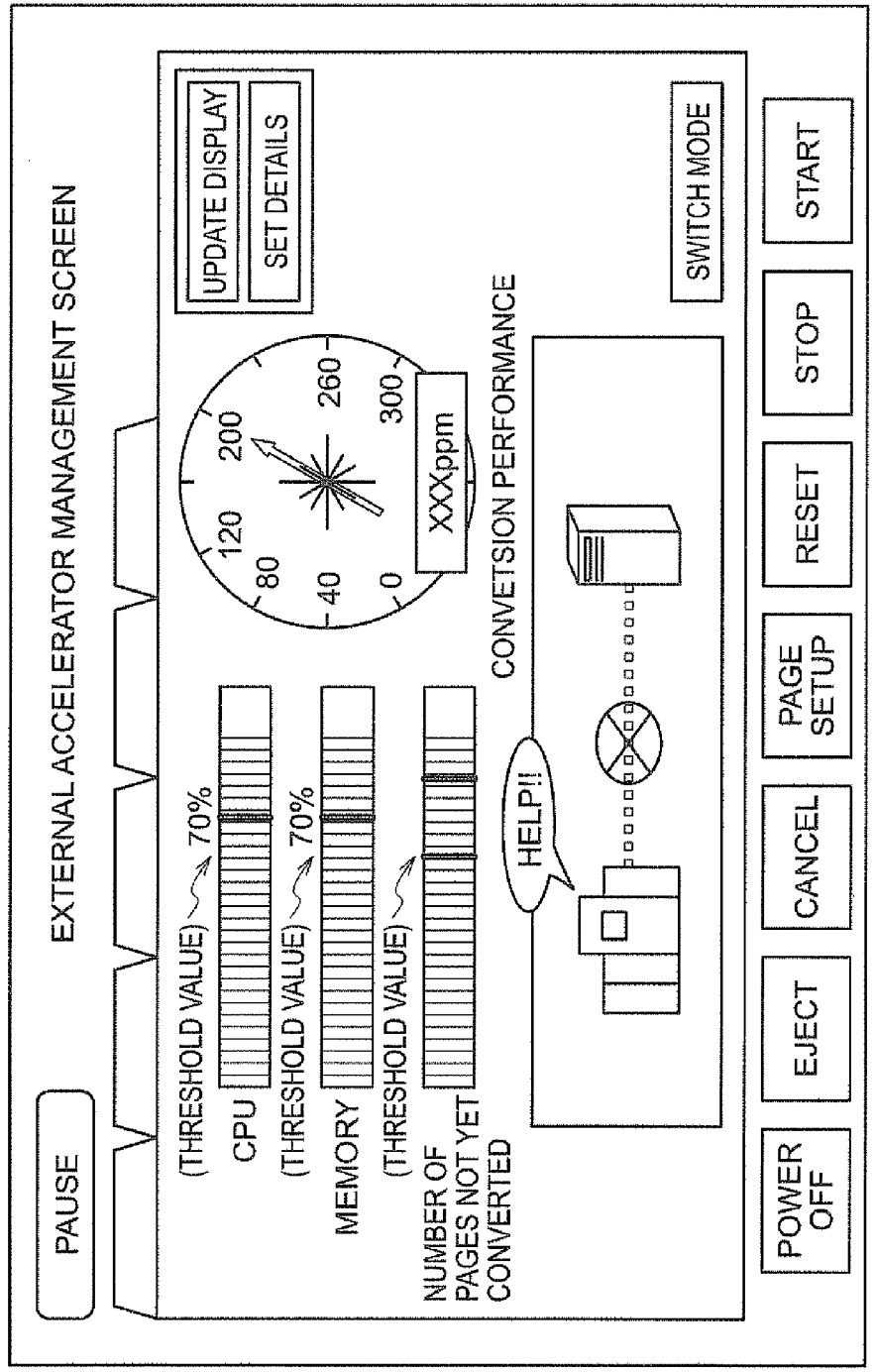
FIG. 11 is an explanatory drawing for explaining a concrete example of the display of processing information at a user interface relating to the first exemplary embodiment.
Figure 12:
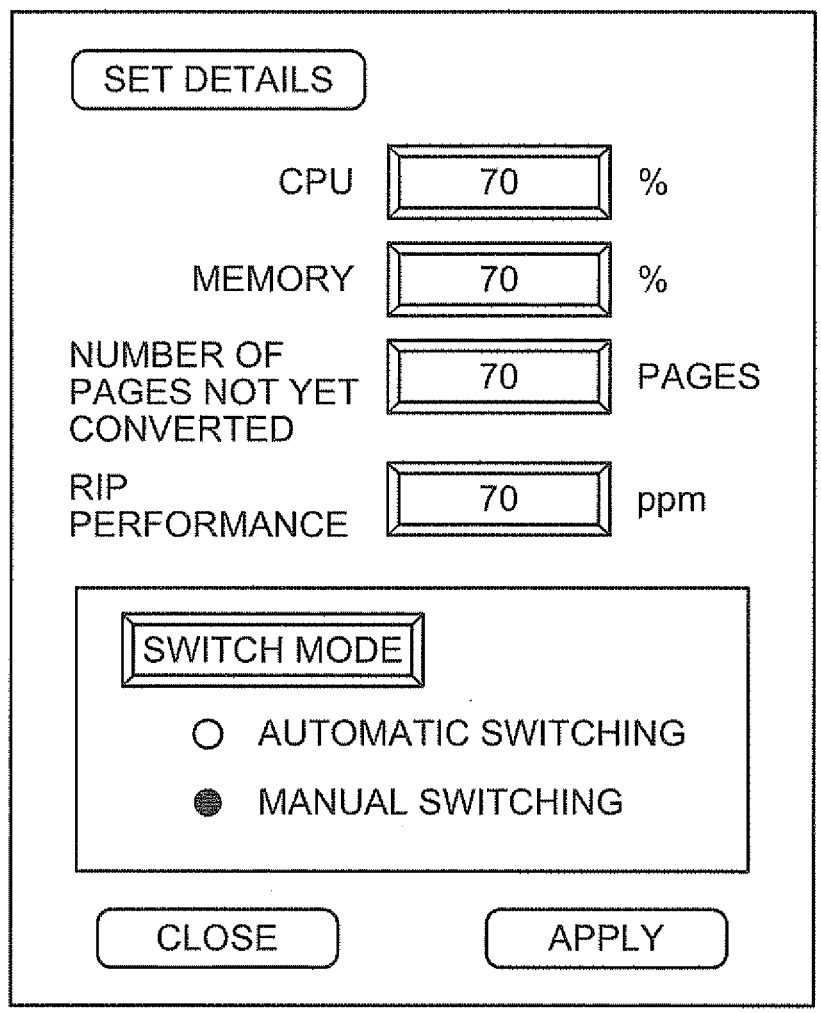
FIG. 12 is an explanatory drawing for explaining a concrete example of displaying, in further detail, the processing information displayed in FIG. 11.

In next step 502, the processing information of the respective conversion output sections 16 are displayed on the user interface 28 of the setting section 29. Concrete examples of the display of processing information are shown in FIG. 11 and FIG. 12. FIG. 11 shows a state of displaying the average values and the threshold values of the usage rates of the CPUs 72, the usage rates of the memories, the numbers of pages not yet subjected to conversion, and the processing speeds (conversion performances) that were acquired from all of the conversion output sections 16. The display may be updated in real time, or may be updated when a user instructs updating using an update display button in the display, and is not particularly limited.

When the user selects a set details button in the display shown in FIG. 11, the display of FIG. 12 is displayed on the user interface 28. Due thereto, the processing information is displayed in detail. The user recognizes the states of the conversion output sections 16 from these displays, and instructs switching of the distribution by a switch mode button in the display of FIG. 11 or FIG. 12.

The display of the processing information is not limited to these examples, and it suffices to have the user recognize the processing information of the conversion output sections 16. It is more preferable to carry out display such that the user can grasp the information at a glance. Further, the respective processing information of all of the conversion output sections 16 may be displayed, rather than the average values of the all of the conversion output sections 16. Moreover, the states of the respective conversion output sections 16 may be displayed per processing information. Or, when expressing that a threshold value has been exceeded, a warning light or a buzzer or the like may be used.

The threshold values that are displayed may be threshold values that are determined in advance, or may be threshold values that the user has set through the user interface 28.

In next step 504, it is judged whether or not the printing mode has been set to M=true through the user interface 28. If the printing mode has not been set to M=true, the judgment is negative, the routine proceeds to step 506, the printing mode is set to M=false, and thereafter, the present processing ends. If the printing mode has been set to M=true, the judgment is affirmative, the routine moves on to step 508, the printing mode is set to M=true, and thereafter, the present processing ends.

In this way, in the present processing, switching is carried out between the first distribution and the second distribution on the basis of the instruction of the user who has recognized the processing information (the information of the processing loads) of the conversion output sections 16 from the user interface 28.

As described above, in the present exemplary embodiment, on the basis of the processing information that the processing information acquiring section 60 of the controller unit 14 acquires from the conversion output sections 16, if the processing loads of the conversion output sections 16 are high, the switching controller 42 carries out control so as to switch the distribution of the data distribution processor 46 to the second distribution. Due thereto, the print data is distributed to the conversion output sections 16 and the external conversion processor group 18, and conversion is carried out at the conversion output sections 16 and the external conversion processor group 18. However, if the processing loads of the conversion output sections 16 are low, the switching controller 42 effects control so as to switch the distribution of the data distribution processing section to the first distribution. Due thereto, the print data is distributed to the conversion output sections 16, and the conversion is carried out at the conversion output sections 16 without using the external conversion processor group 18.

In this way, in the present exemplary embodiment, when the processing loads of the conversion output sections 16 are high, the print data is distributed to the conversion output sections 16 and the external conversion processor group 18 and conversion is carried out. When the processing loads are low, the print data is distributed to the conversion output sections, and conversion is carried out without using the external conversion processor group 18.

When the processing loads are low, there are cases in which the load, that is needed for the distribution that distributes the print data from the controller unit 14 to the external conversion processor group 18, exceeds the loads of the respective conversion output sections 16. In this case, the speed of the overall image processing may decrease. Therefore, the aforementioned threshold values may be set in advance as switching conditions in accordance with whether or not the speed of the overall image processing decreases by distributing the print data to the external conversion processor group 18, as compared with a case in which the print data is not distributed thereto.

Accordingly, in the present exemplary embodiment, a decrease in the processing speed is suppressed in a configuration in which the external conversion processor group 18 (external conversion processors 19) is provided separately from the multiple conversion output sections 16 for the image formation sections 8 of respective colors of CMYK, and conversion of print data is performed using them in parallel.

As described above, an image formation device provided with plural conversion output sections for image formation sections of respective colors (CMYK) is generally known. In order to achieve high processing speed in this kind of image formation device, providing another conversion section other than the plural conversion output sections is contemplated. However, there are cases in which the processing speed would be decreased rather than increased by employing such a technique. Examples of such cases include a case in which a processing load of conversion of the print data is relatively low. In contrast, reduction in processing speed is suppressed in the image processing device 10 of the present exemplary embodiment by performing the control described above, even in the case of adopting a configuration in which the external conversion processor group 18 (external conversion processors 19) is provided separately from the multiple conversion output sections 16 for the image formation sections 8 of respective colors of CMYK and conversion of the print data is performed using them in parallel.

In the case of the first distribution, the power sources of the external conversion processors 19 that are not used may be switched to a power saving mode. In this case, the controller unit 14 may instruct the conversion processors 19 to switch to the power saving mode. Or, the conversion processors 19 may switch to the power saving mode when print data is not distributed thereto even after a predetermined time period elapses.

The present exemplary embodiment is illustrated such that the second distribution is carried out at the start of printing that serves as the initial state. However, the present exemplary embodiment is not limited to the same. For example, the first distribution may be carried out from the start of printing in the case of print data for which is known in advance, from, for example, printing carried out in the past or the like, that is preferable to carry out the first distribution.

Further, each time processing of print data ends, the printing mode may be reset, or the setting at the time of the previous processing may be continued.

[Second Exemplary Embodiment]

A second exemplary embodiment is described in detail hereinafter with reference to the drawings. The structure of an image processing device of the present exemplary embodiment is substantially similar to that of the image processing device 10 of the first exemplary embodiment. In the present exemplary embodiment, the conversion output sections 16 have the function of the switching controller 42 that was provided at the controller unit 14 of the image processing device 10, and the first distribution and the second distribution are switched in accordance with control from the conversion output sections 16.

Figure 13:
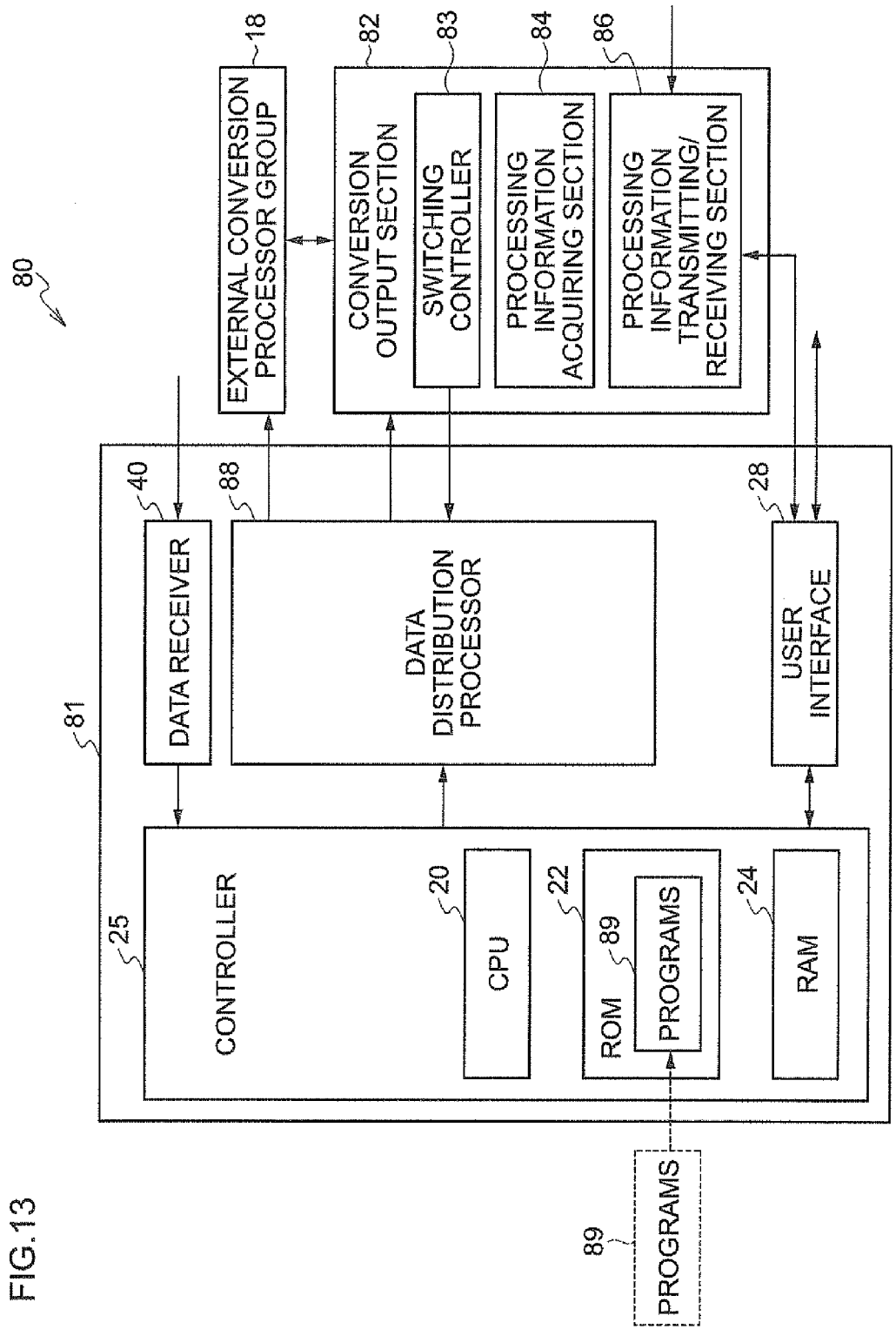
FIG. 13 is a functional block diagram showing an example of the schematic structure of a controller unit and a conversion output section relating to a second exemplary embodiment.

A schematic structural drawing of an example of the schematic structures of a controller unit 81 and an conversion output section 82 of the present exemplary embodiment is shown in FIG. 13. The controller unit 81 of the present exemplary embodiment includes the controller 25, the user interface 28, the data receiver 40, and a data distribution processor 88. The controller unit 81 of the present exemplary embodiment is different from the controller unit 14 of the first exemplary embodiment in that the switching controller 42 and the processing information acquiring section 60 are not provided, and that the setting section 29 is not provided but the user interface 28 is provided, and the function of the data distribution processor 88.

Further, the conversion output section 82 of the present exemplary embodiment includes a switching controller 83 and a processing information acquiring section 84 in addition to the configuration of the conversion output section 16 (FIG.

5), and some of the functions of a processing information transmitting/receiving section 86 are different from those of the transmitting/receiving section 70 in the conversion output section 16.

The image processing that is carried out at an image processing device 80 is described next. In the flow of the overall image processing, only the print data distribution processing is different from that of the flow (FIG. 6) of the overall image processing that is carried out by the image processing device 10 of the first exemplary embodiment, and the other processings are substantially similar. Therefore, hereinafter, the print data distribution processing of the present exemplary embodiment is described, and explanations for the other parts are omitted.

Figure 14:
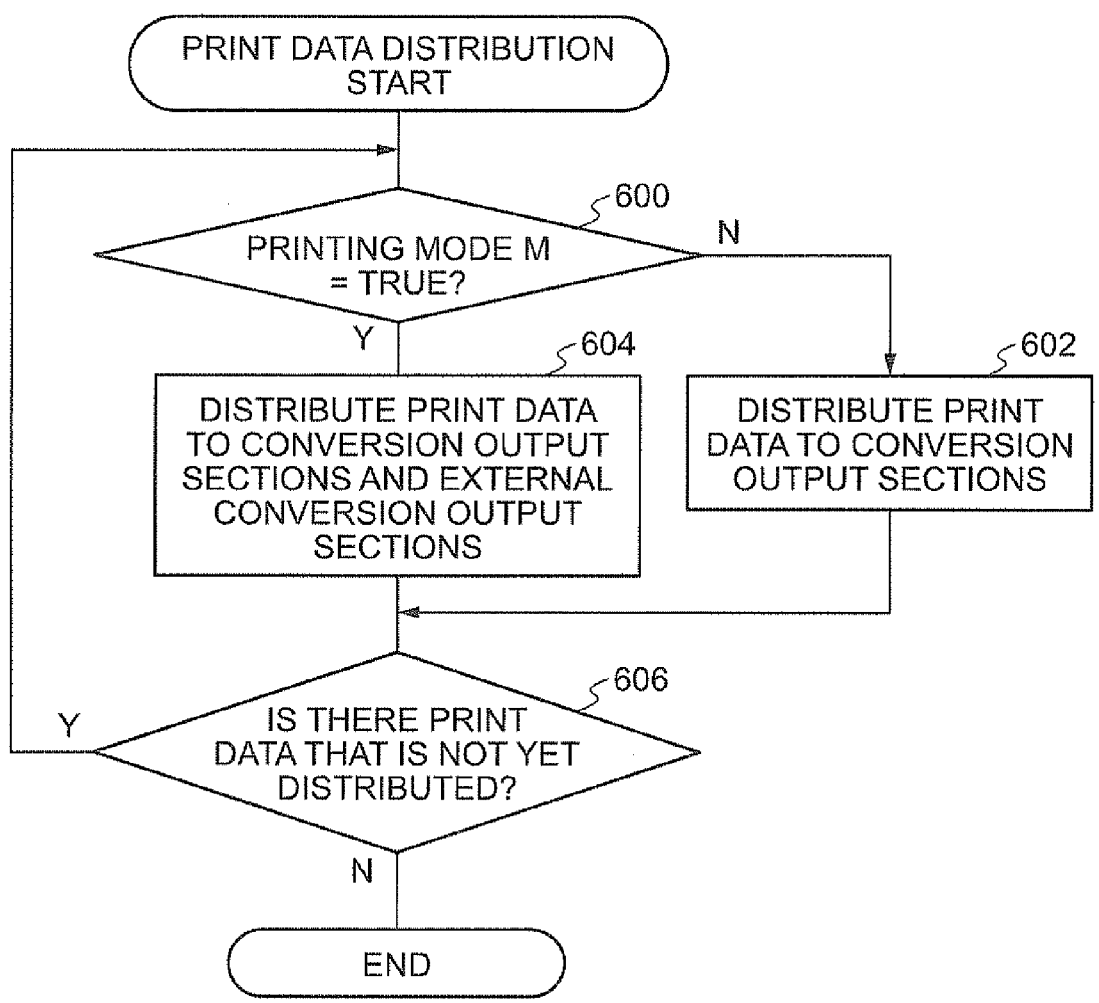
FIG. 14 is a flowchart showing an example of the flow of print data distribution processing that is executed at a controller of a controller unit when a switching controller carries out switching automatically, relating to the second and third exemplary embodiments.

FIG. 14 is a flowchart of an example of print data distribution processing (a program 89) that is executed at the controller 25 of the controller unit 81 when the switching controller 83 carries out switching automatically. The present processing corresponds to the print data distribution processing shown in FIG. 7. Step 600 of the present processing corresponds to step 200 of FIG. 7, step 602 corresponds to step 202, step 604 corresponds to step 204, and step 606 corresponds to step 212.

In step 600, it is judged whether or not the printing mode M is "true". In the present exemplary embodiment, when the data distribution processor 88 receives a switching instruction from the switching controller 83 of the conversion output section 82 to switch the printing mode (the mode expressing which of the first distribution and the second distribution is to be carried out), the data distribution processor 88 switches the printing mode M. Therefore, when the data distribution processor 88 receives a switching instruction, it is judged whether or not the instructed printing mode M is true. When the data distribution processor 88 has not received a switching instruction, it is judged whether or not the current printing mode M is true. If the judgment is negative, the routine proceeds to step 602, the first distribution processing is carried out, and thereafter, the routine moves on to step 606. If the judgment is affirmative, the routine moves on to step 604, the second distribution processing is carried out, and thereafter, the routine moves on to step 606. In step 606, it is judged whether or not there is print data that has not yet been distributed. If the judgment is affirmative, the routine returns to step 600 and the present processing is repeated. If the judgment is negative, the present processing ends.

Figure 15:
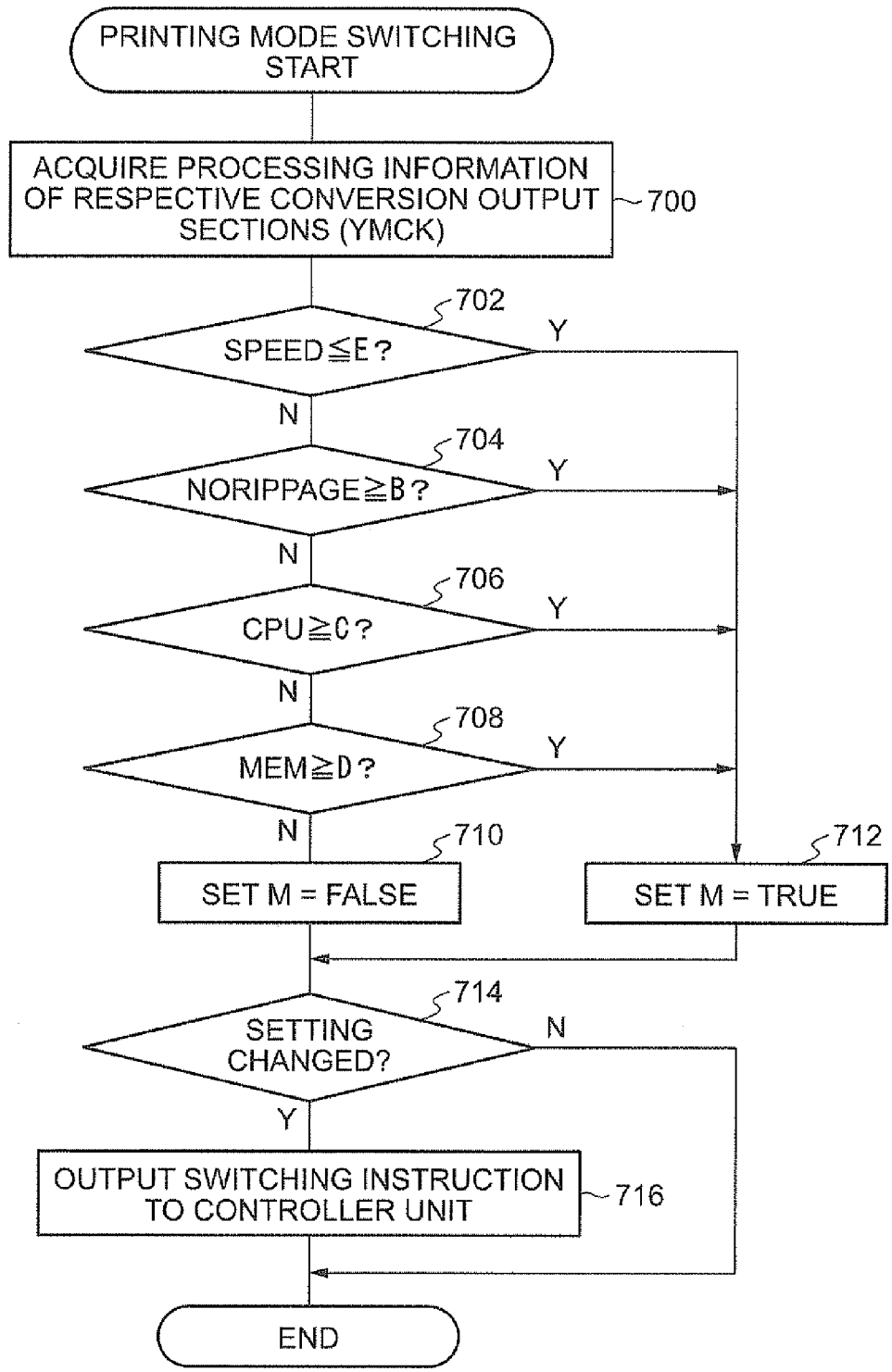
FIG. 15 is a flowchart showing an example of the flow of printing mode switching processing that is executed at a controller of a conversion output section when the switching controller relating to the second and third exemplary embodiments carries out switching automatically.

The printing mode switching processing of the present exemplary embodiment is described in detail next. In the present exemplary embodiment, the conversion output section 82 acquires processing information. On the basis of the processing information, if the printing mode M is to be changed, the conversion output section 82 outputs a switching instruction to the controller unit 81. FIG. 15 is a flowchart of an example of the printing mode switching processing of the present exemplary embodiment that is executed at the conversion output section 82. The present processing corresponds to the printing mode switching processing shown in FIG. 8. Step 700 of the present processing corresponds to step 300 of FIG. 8, step 702 corresponds step 302, step 704 corresponds to step 304, step 706 corresponds to step 306, step 708 corresponds to step 308, step 710 corresponds to step 310, and step 712 corresponds to step 312.

In step 700, the processing information acquiring section 84 acquires the processing information of its own device and the processing information from the processing information transmitting/receiving sections 86 of the other conversion output sections 82.

In next step 702, it is judged whether or not Speed≤E. If the judgment is affirmative, the routine moves on to step 712, whereas if the judgment is negative, the routine proceeds to step 704. In step 704, it is judged whether or not NoRipPage≥B. If the judgment is affirmative, the routine proceeds to step 712, whereas if the judgment is negative, the routine moves on to step 706. In step 706, it is judged whether or not CPU≥C. If the judgment is affirmative, the routine moves on to step 712, whereas if the judgment is negative, the routine proceeds to step 708. In step 708, it is judged whether or not Mem≥D. If the judgment is affirmative, the routine moves on to step 712, whereas if the judgment is negative, the routine moves on to step 710.

In step 710, the printing mode M is set to printing mode M=false, and thereafter, the routine proceeds to step 714. In step 712 where it has been judged that the processing load is high, the printing mode M is set to printing mode M=true, and thereafter, the routine moves on to step 714.

In step 714, it is judged whether or not the setting has been changed. It is judged, due to the processing of step 710 or step 712, whether the printing mode M has been changed. If the printing mode M has been changed, the judgment is affirmative and the routine proceeds to step 716. In step 716, a switching instruction is outputted from the switching controller 83 to the data distribution processor 88 of the controller unit 81, and thereafter, the present processing ends. If the printing mode has not been changed, the judgment is negative and switching is not necessary. Therefore, the present processing ends.

In this way, in accordance with the present processing, the printing mode M is set to the second distribution when it is judged that the processing loads of the conversion output sections 16 are high, and is set to the first distribution when it is judged that the processing loads are low. When there is a change between the current distribution state and the newly set printing mode M, a switching instruction is outputted to the data distribution processor 88 of the controller unit 81. In accordance with the switching instruction, the data distribution processor 88 switches from the first distribution to the second distribution, or from the second distribution to the first distribution, and carries out distribution processing accordingly.

Figure 16:
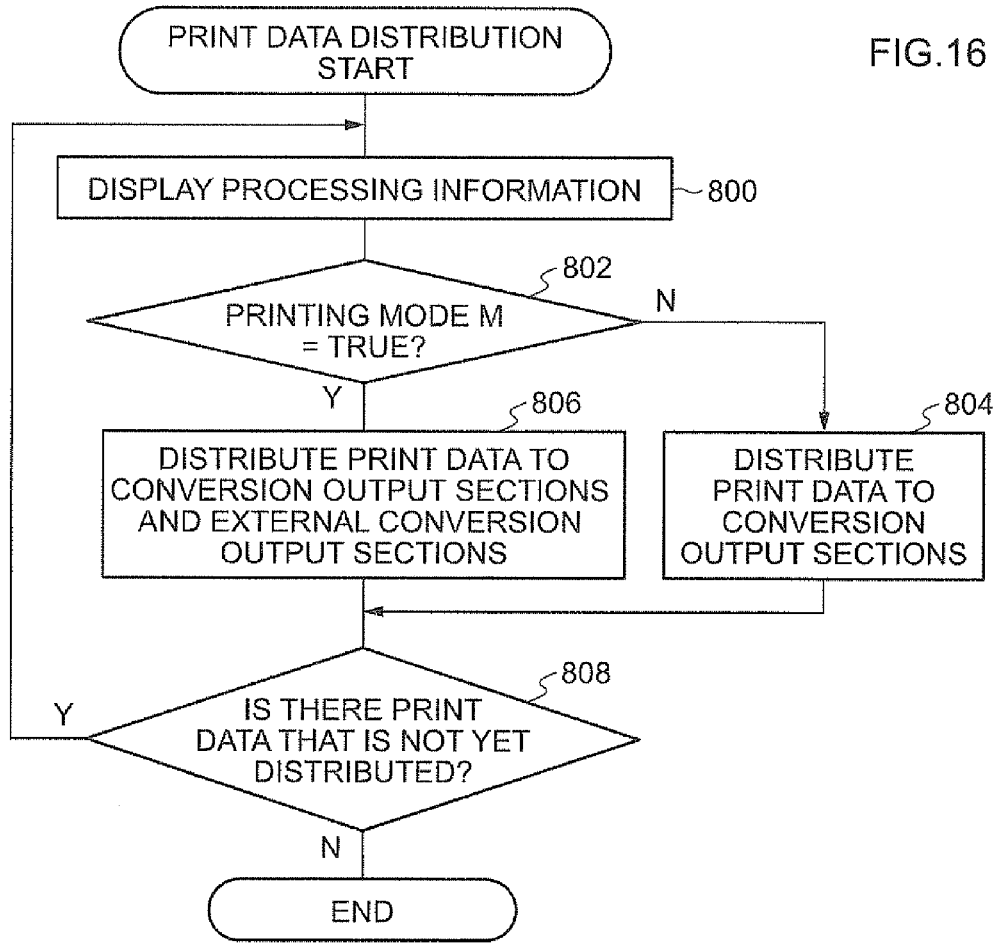
FIG. 16 is a flowchart showing an example of the flow of print data distribution processing that is executed at the controller of the controller unit when the switching controller carries out switching in accordance with manual operation by a user, relating to the second and third exemplary embodiments.

The print data distribution processing of the present exemplary embodiment when the switching controller 83 carries out switching in accordance with manual operation by the user, is described next. FIG. 16 is a flowchart of an example of print data distribution processing that is executed at the controller 25 of the controller unit 81 of the present exemplary embodiment. The present processing corresponds to the print data distribution processing shown in FIG. 14. Step 802 of the present processing corresponds to step 600 of FIG. 14, step 804 corresponds to step 602, step 806 corresponds to step 604, and step 808 corresponds to step 606.

In step 800, display of the processing information is carried out. In the present exemplary embodiment, the processing information received from the processing information transmitting/receiving sections 86 of the conversion output sections 82 is displayed on the user interface 28 in accordance with an instruction.

In next step 802, it is judged whether or not the printing mode M is "true". In the present exemplary embodiment, judgment is carried out on the printing mode M that is set and instructed by the user via the user interface 28. If the judgment is negative, the routine proceeds to step 802, the first distribution processing is carried out, and thereafter, the routine moves on to step 808. If the judgment is affirmative, the routine moves on to step 806, the second distribution processing is carried out, and thereafter, the routine moves on to step 808. In step 808, it is judged whether there is print data that has not yet been distributed. If the judgment is affirmative, the routine returns to step 800 and the present processing is repeated. If the judgment is negative, the present processing ends.

Figure 17:
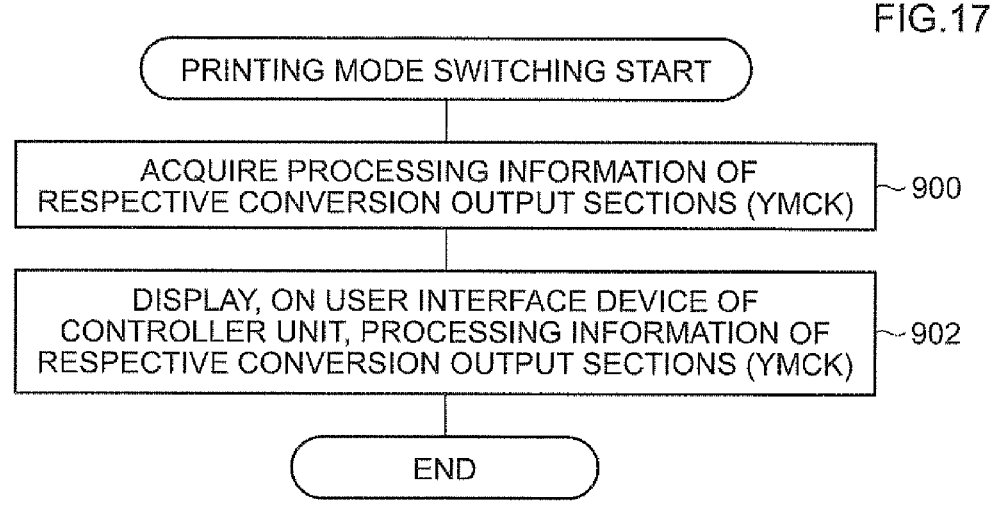
FIG. 17 is a flowchart showing an example of the flow of printing mode switching processing that is executed at the controller of the conversion output section when the switching controller carries out switching in accordance with manual operation by a user, relating to the second and third exemplary embodiments.

A flowchart of an example of the printing mode switching processing of the present exemplary embodiment that is executed at the conversion output section 82 is shown in FIG. 17. The present processing corresponds to the printing mode switching processing shown in FIG. 10. Step 900 of the present processing corresponds to step 500 of FIG. 10, and step 902 corresponds to step 502 of FIG. 10.

In step 900, the processing information acquiring section 84 acquires the processing information of its own device and the processing information from the processing information transmitting/receiving sections 86 of the other conversion output sections 82.

In next step 902, an instruction to display the processing information of the respective conversion output sections 16 is outputted from the processing information transmitting/receiving section 86 to the user interface 28 of the controller unit 81, and thereafter, the present processing ends.

In this way, in accordance with the present processing, the processing information of the respective conversion output sections 82, that the conversion output section 82 acquires, is displayed on the user interface 28 of the controller unit 81. Therefore, switching between the first distribution and the second distribution can be carried out on the basis of the instruction of the user who has recognized the processing information from the display of the user interface 28.

As described above, in the present exemplary embodiment, the conversion output section 82 has the switching controller 83 and the processing information acquiring section 84. The switching controller 83 effects control of switching the distribution of the data distribution processor 88 of the controller unit 81, on the basis of the processing information of its own device and the processing information of the other conversion output sections 82 that are acquired by the processing information acquiring section 84. Accordingly, in the same way as in the first exemplary embodiment, a decrease in the image processing speed is suppressed in a configuration in which the external conversion processor group 18 (external conversion processors 19) is provided separately from the multiple conversion output sections 16 for the image formation sections 8 of respective colors of CMYK, and conversion of print data is performed using them in parallel.

Further, in the present exemplary embodiment, the conversion output section 82 controls the data distribution processor 88 of the controller unit 81. Therefore, at the controller unit 81, switching between the first distribution and the second distribution can be carried out without being aware of the states, such as the processing loads of the conversion output sections 82. Thus, the burden of the controller unit 81 can be reduced.

In the present exemplary embodiment, one of the conversion output sections 82 acquires the processing information of its own device and of the other conversion output sections 82, and uses the acquired processing information. However, the exemplary embodiment is not limited to the same. Instead, each conversion output section 82 may acquire and use the processing information of its own device. In this case, each conversion output section 82 respectively outputs a switching instruction to the controller unit 81 on the basis of the processing information of its own device and the threshold value. In the case of manual operation, each conversion output section 82 respectively outputs an instruction to cause the user interface 28 of the controller unit 81 to display the processing information of its own device.

[Third Exemplary Embodiment]

A third exemplary embodiment is described in detail hereinafter with reference to the drawings. The configuration of an image processing device of the present exemplary embodiment is substantially similar to those of the image processing device 10 of the first exemplary embodiment and the image processing device 80 of the second exemplary embodiment. In the present exemplary embodiment, an external conversion output section 98 is provided with the function of the switching controller 42, and switching between the first distribution and the second distribution is carried out in accordance with control from the conversion output section 98.

Figure 18:
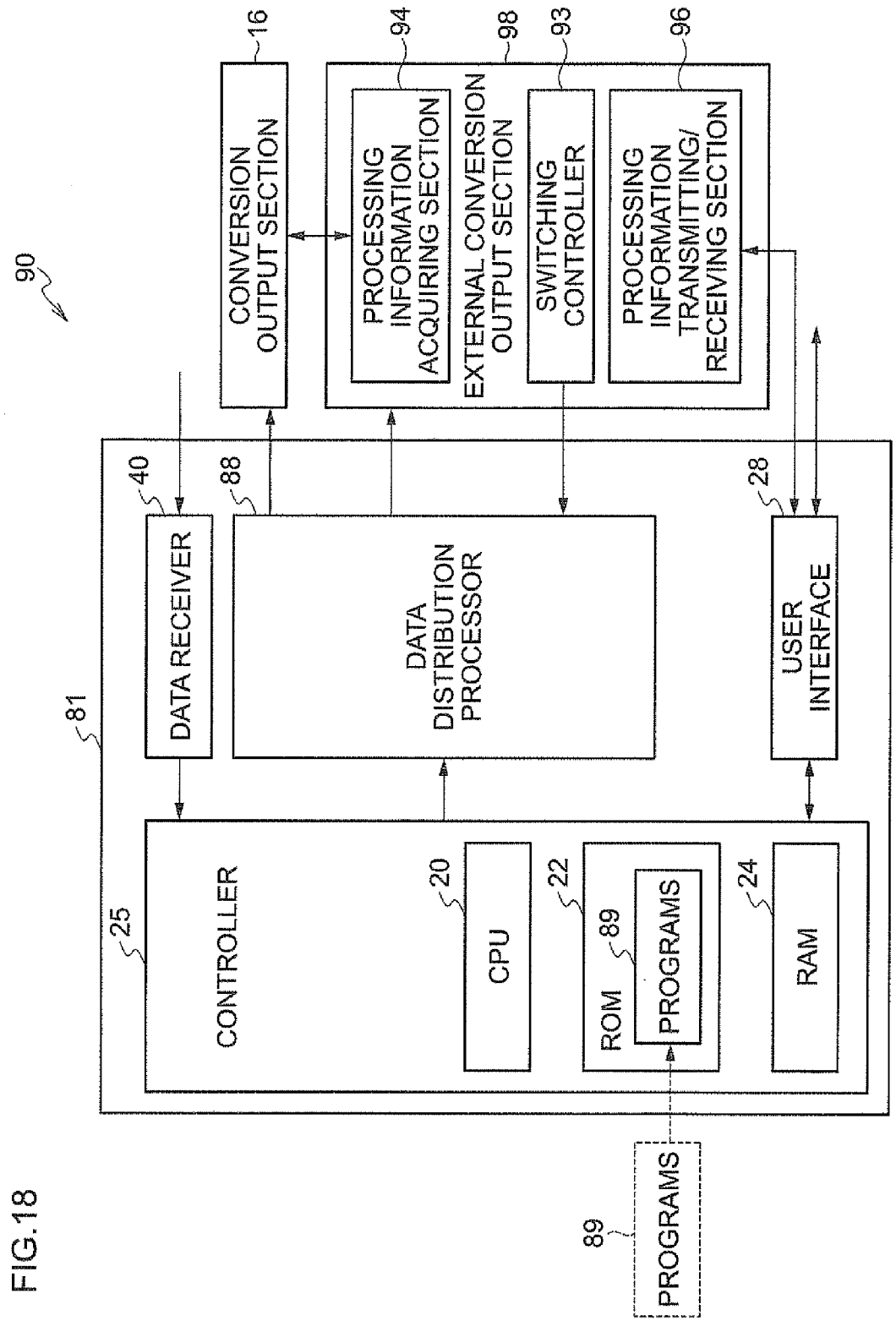
FIG. 18 is a functional block diagram showing an example of the schematic structure of the controller unit, the conversion output section, and an external conversion processor relating to the third exemplary embodiment.

FIG. 18 is a schematic structural drawing of an example of the schematic structures of the controller unit 81 of an image processing device 90 of the present exemplary embodiment, and the conversion output section 16 and the external conversion output section 98. Because the controller unit 81 of the present exemplary embodiment has a configuration that is substantially similar to that of the second exemplary embodiment, description thereof is omitted. Further, because the conversion output section 16 has a configuration that is substantially similar to that of the conversion output section 16 of the first exemplary embodiment, description thereof is omitted.

The external conversion output section 98 of the present exemplary embodiment has, in addition to the functions of receiving print data and carrying out conversion, a switching controller 93 that controls switching between the first distribution and the second distribution of the data distribution processor 88 of the controller unit 14, and a processing information acquiring section 94, and a processing information transmitting/receiving section 96. The switching controller 93 corresponds to the switching controller 83 of the conversion output section 82 of the second exemplary embodiment, the processing information acquiring section 94 corresponds to the processing information acquiring section 84, and the processing information transmitting/receiving section 96 corresponds to the processing information transmitting/receiving section 86.

As described above, the image processing carried out at the image processing device 90 of the present exemplary embodiment has a substantially similar structure, other than the external conversion output section 98 having the function of the conversion output section 82 of the second exemplary embodiment, and therefore, carries out substantially similar operation. Namely, an example of the flow of the print data distribution processing that is executed at the control section of the controller when the switching controller carries out switching control automatically, is as shown in FIG. 14. Further, in this case, an example of the flow of the printing mode switching processing that is executed at the external conversion output section 98 is as shown in FIG. 15.

Moreover, an example of the flow of the print data distribution processing, that is executed at the control section of the controller when the switching controller carries out switching control in accordance with manual operation by the user, is as shown in FIG. 16. In this case, an example of the flow of the printing mode switching processing that is executed at the external conversion output section 98 is as shown in FIG. 17.

As described above, in the present exemplary embodiment, the external conversion output section 98 has the switching controller 93, the processing information acquiring section 94 and the processing information transmitting/receiving section 96. On the basis of the acquired processing information of the respective conversion output sections 16, the switching controller 93 carries out control so as to switch the distribution of the data distribution processor 88 of the controller unit 81. Accordingly, in the same way as in the first exemplary embodiment and the second exemplary embodiment, a decrease in the image processing speed is suppressed in a configuration in which the external conversion processor group 18 (external conversion processors 19) is provided separately from the multiple conversion output sections 16 for the image formation sections 8 of respective colors of CMYK, and conversion of print data is performed using them in parallel.

Further, in the present exemplary embodiment, the external conversion processor 18 controls the data distribution processor 88 of the controller unit 81. Therefore, at the controller unit 81, switching between the first distribution and the second distribution is carried out without being aware of the states, such as the processing loads or the like, of the conversion output sections 82. Thus, the burden of the controller unit 81 is reduced. Further, the processing load of the conversion output section 16 is reduced as compared with a case in which the switching control is carried out at the conversion output section 16.

What is claimed is:

1. An image processing device comprising:
a plurality of print processors for different colors, each of the plurality of print processors performing printing of a corresponding color onto a recording medium;
a plurality of first conversion sections provided for each of the plurality of print processors, each of the plurality of first conversion sections converting print data described in page description language into raster image data, and outputting the converted raster image data to the corresponding print processor;
a second conversion section that converts the print data into raster image data and outputs the converted raster image data to any of the plurality of print processors; and
a controller that selectively performs a first control that causes the plurality of first conversion sections to convert the print data that has been input to the device, or a second control that causes the plurality of first conversion sections and the second conversion section to convert the input print data;
wherein the controller performs the second control in a case in which a time period that is expected to be needed in order to carry out conversion of all of a plurality of pages included in the print data when carrying out the second control, is shorter than a time period that is expected to be needed in order to carry out conversion of all of the plurality of pages included in the print data when carrying out the first control.

2. An image processing device comprising:
a plurality of print processors for different colors, each of the plurality of print processors performing printing of a corresponding color onto a recording medium;
a plurality of first conversion sections provided for each of the plurality of print processors, each of the plurality of first conversion sections converting print data described in page description language into raster image data, and outputting the converted raster image data to the corresponding print processor;
a second conversion section that converts the print data into raster image data and outputs the converted raster image data to any of the plurality of print processors; and
a controller that selectively performs a first control that causes the plurality of first conversion sections to convert the print data that has been input to the device, or a second control that causes the plurality of first conversion sections and the second conversion section to convert the input print data;
wherein the controller comprises a setting section that sets conditions for selecting the first control or the second control, and the controller selects the first control or the second control based on the conditions set in the setting section.

3. An image processing device comprising:
a plurality of print processors for different colors, each of the plurality of print processors performing printing of a corresponding color onto a recording medium;
a plurality of first conversion sections provided for each of the plurality of print processors, each of the plurality of first conversion sections converting print data described in page description language into raster image data, and outputting the converted raster image data to the corresponding print processor;
a second conversion section that converts the print data into raster image data and outputs the converted raster image data to any of the plurality of print processors; and
a controller that selectively performs a first control that causes the plurality of first conversion sections to convert the print data that has been input to the device, or a second control that causes the plurality of first conversion sections and the second conversion section to convert the input print data;
wherein the controller performs the second control in a case in which a processing load for conversion by the plurality of first conversion sections is higher than a predetermined threshold value.

4. An image processing device comprising:
a plurality of print processors for different colors, each of the plurality of print processors performing printing of a corresponding color onto a recording medium;
a plurality of first conversion sections provided for each of the plurality of print processors, each of the plurality of first conversion sections converting print data described in page description language into raster image data, and outputting the converted raster image data to the corresponding print processor;
a second conversion section that converts the print data into raster image data and outputs the converted raster image data to any of the plurality of print processors; and
a controller that selectively performs a first control that causes the plurality of first conversion sections to convert the print data that has been input to the device, or a second control that causes the plurality of first conversion sections and the second conversion section to convert the input print data;
wherein the controller initially performs the first control when the controller starts control.

5. An image processing method comprising:
converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;
converting, using a second conversion section, the print data into raster image data and outputting the converted raster data to any of the plurality of print processors;
selectively performing a first control that causes the plurality of first conversion sections to convert the print data that has been input, or a second control that causes the plurality of first conversion sections and the second conversion section to convert the input print data; and performing the second control in a case in which a processing load for conversion by the plurality of first conversion sections is higher than a predetermined threshold value.

6. An image processing method comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and initially performing the first control.

7. An image processing method comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and setting conditions for selecting the first control or the second control, and selecting the first control or the second control based on the conditions. .

8. An image processing method comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and performing the second control in a case in which a time period that is expected to be needed in order to carry out conversion of all of a plurality of pages included in the print data when carrying out the second control, is shorter than a time period that is expected to be needed in order to carry out conversion of all of the plurality of pages included in the print data when carrying out the first control.

9. A non-transitory storage medium that stores a program for causing a computer to execute image processing, the image processing comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and performing the second control in a case in which a processing load for conversion by the plurality of first conversion sections is higher than a predetermined threshold value.

10. A non-transitory storage medium that stores a program for causing a computer to execute image processing, the image processing comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and initially performing the first control.

11. A non-transitory storage medium that stores a program for causing a computer to execute image processing, the image processing comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and setting conditions for selecting the first control or the second control, and selecting the first control or the second control based on the conditions set.

12. A non-transitory storage medium that stores a program for causing a computer to execute image processing, the image processing comprising:

converting, using a plurality of first conversion sections provided for each of a plurality of print processors, print data described in page description language into raster image data and outputting the converted raster data to the plurality of print processors, each of the plurality of print processors corresponding to different colors and performing printing of a corresponding color onto a recording medium;

converting, using a second conversion section, the print data into raster image data and outputting the converted raster data to any of the plurality of print processors;

selectively performing a first control that causes the plurality of first conversion sections to convert the print data that has been input, or a second control that causes the plurality of first conversion sections and the second conversion section to convert the input print data; and performing the second control in a case in which a time period that is expected to be needed in order to carry out conversion of all of a plurality of pages included in the print data when carrying out the second control, is shorter than a time period that is expected to be needed in order to carry out conversion of all of the plurality of pages included in the print data when carrying out the first control.

* * * * *